(12) United States Patent
Hay et al.

(10) Patent No.: US 10,161,246 B1
(45) Date of Patent: Dec. 25, 2018

(54) ROTATABLE SENSORS FOR MEASURING CHARACTERISTICS OF SUBTERRANEAN FORMATION

(71) Applicant: HALLIBURTON ENERGY SERVICES, INC., Houston, TX (US)

(72) Inventors: Richard Thomas Hay, Spring, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/047,893

(22) Filed: Jul. 27, 2018

Related U.S. Application Data

(62) Division of application No. 14/429,068, filed as application No. PCT/US2014/032520 on Apr. 1, 2014, now Pat. No. 10,053,978.

(51) Int. Cl.
| | | |
|---|---|---|
| *E21B 49/00* | (2006.01) | |
| *G01B 7/30* | (2006.01) | |
| *G01V 3/28* | (2006.01) | |
| *E21B 7/06* | (2006.01) | |
| *E21B 3/00* | (2006.01) | |
| *E21B 47/024* | (2006.01) | |
| *E21B 47/01* | (2012.01) | |
| *E21B 4/00* | (2006.01) | |

(52) U.S. Cl.
CPC ............. *E21B 49/00* (2013.01); *E21B 3/00* (2013.01); *E21B 7/06* (2013.01); *E21B 47/01* (2013.01); *E21B 47/024* (2013.01); *G01B 7/30* (2013.01); *G01V 3/28* (2013.01); *E21B 4/00* (2013.01)

(58) Field of Classification Search
CPC .......... E21B 49/00; E21B 4/00; E21B 47/024; E21B 47/01; E21B 7/06; E21B 3/00; G01V 3/28; G01B 7/30
USPC ... 324/338–371, 323, 200, 207.13–247, 500, 324/529, 530, 160, 177–179, 329, 637; 702/6–13, 106
See application file for complete search history.

(56) References Cited

U.S. PATENT DOCUMENTS

| | | | |
|---|---|---|---|
| 5,410,303 A | | 4/1995 | Comeau et al. |
| 6,064,210 A | * | 5/2000 | Sinclair .................... G01V 3/20 324/338 |

(Continued)

FOREIGN PATENT DOCUMENTS

| | | |
|---|---|---|
| CN | 100410489 | 8/2008 |
| WO | 0204986 | 1/2002 |

OTHER PUBLICATIONS

U.S. Appl. No. 14/429,068, "Non-Final Office Action", dated Jan. 2, 2018, 13 pages.

(Continued)

*Primary Examiner* — Melissa Koval
*Assistant Examiner* — Trung Nguyen
(74) *Attorney, Agent, or Firm* — Kilpatrick Townsend & Stockton LLP

(57) ABSTRACT

Sensor assemblies are described for measuring isotropic, anisotropic, or directionally dependent, characteristics of a subterranean formation. Sensor assemblies can include sensors deployed on a tool string. One or more of the sensors can be rotatable relative to the tool string. Rotating one or more sensors relative to the tool string can provide data about the subterranean formation at multiple points around the tool string.

16 Claims, 11 Drawing Sheets

(56) References Cited

U.S. PATENT DOCUMENTS

| | | | |
|---|---|---|---|
| 6,163,155 A | 12/2000 | Bittar | |
| 6,556,015 B1 | 4/2003 | Omeragic et al. | |
| 6,614,360 B1 * | 9/2003 | Leggett, III | E21B 44/00 340/853.1 |
| 6,739,409 B2 | 5/2004 | Kruspe et al. | |
| 6,911,824 B2 | 6/2005 | Bittar | |
| 7,848,887 B2 | 12/2010 | Yang et al. | |
| 10,053,978 B2 * | 8/2018 | Hay | E21B 47/01 |
| 2010/0200295 A1 | 8/2010 | Schimanski et al. | |
| 2011/0280101 A1 | 11/2011 | Wang | |
| 2012/0081122 A1 | 4/2012 | Frey | |
| 2012/0217968 A1 | 8/2012 | Seydoux et al. | |
| 2013/0014992 A1 | 1/2013 | Sharp et al. | |
| 2013/0154650 A1 | 6/2013 | Bittar et al. | |

OTHER PUBLICATIONS

U.S. Appl. No. 14/429,068 , "Notice of Allowance", dated Apr. 25, 2018, 7 pages.
Australian Patent Application No. 2014389539 , "First Examiner Report", dated Sep. 21, 2016, 3 pages.
Australian Patent Application No. 2014389539 , "First Examination Report", 3 pages.
Canadian Patent Application No. 2,939,953 , "Office Action", dated Jun. 19, 2017, 3 pages.
Canadian Patent Application No. 2,939,953 , "Office Action", dated May 22, 2018, 4 pages.
German Patent Application No. 11 2014 006 333.9 , "Office Action", dated May 17, 2018, 8 pages.
International Patent Application No. PCT/US2014/032520 , "International Search Report and Written Opinion", dated Dec. 23, 2014, 16 pages.

* cited by examiner

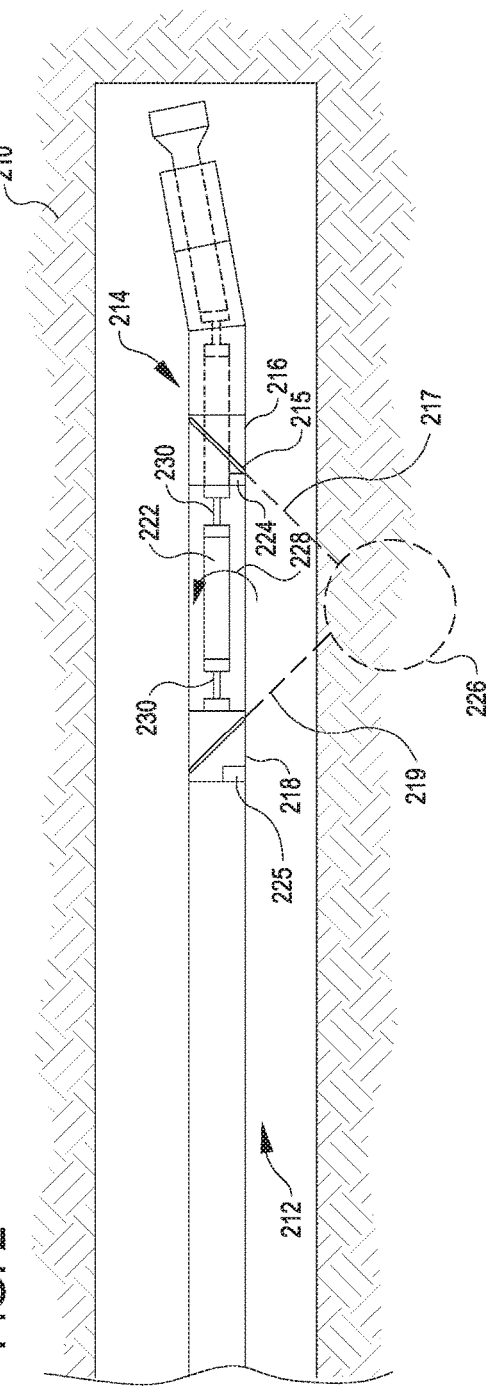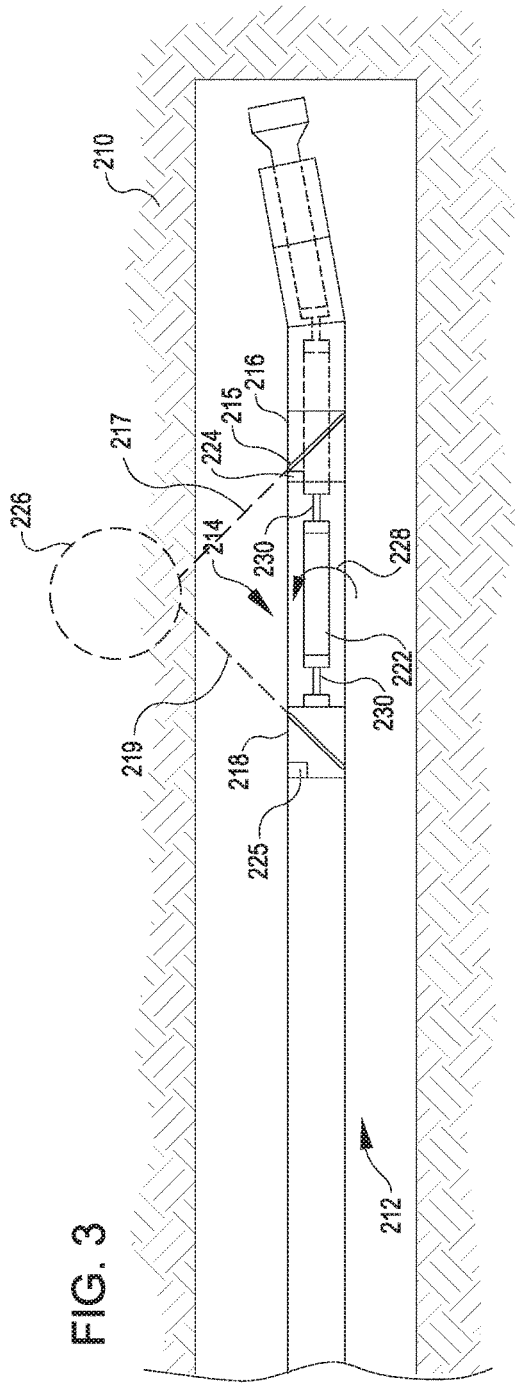

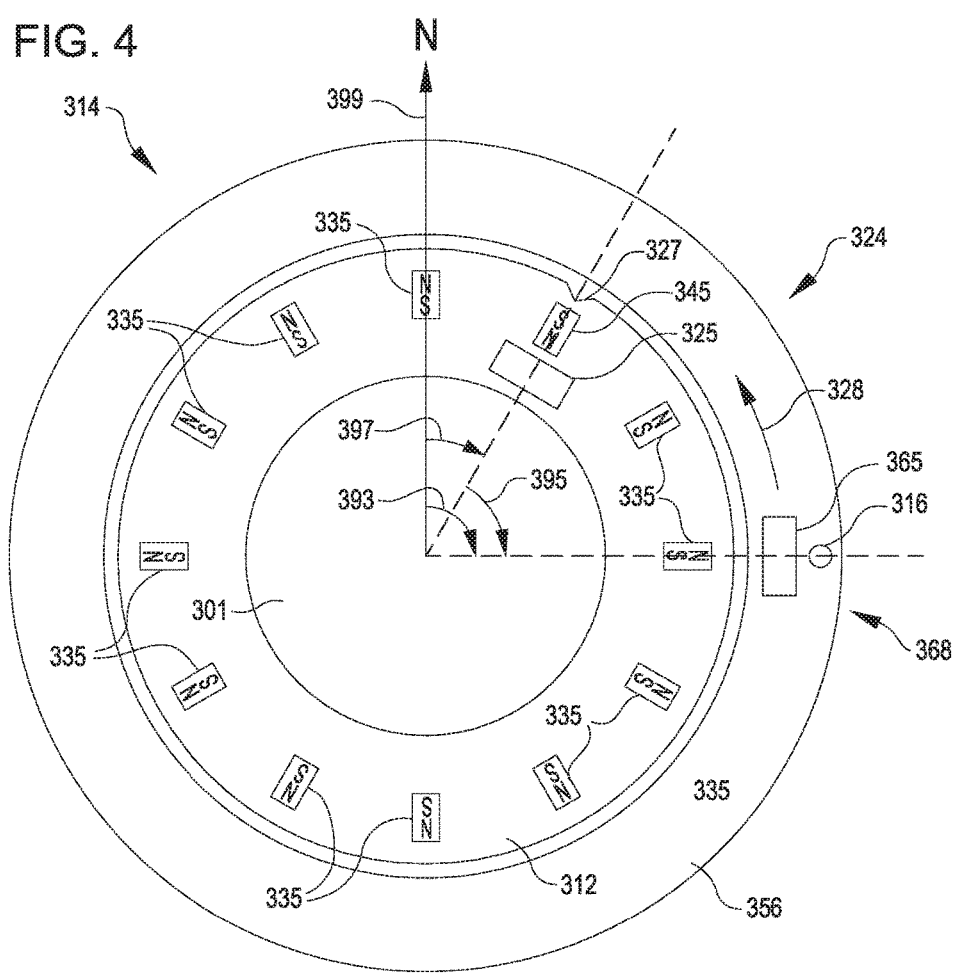

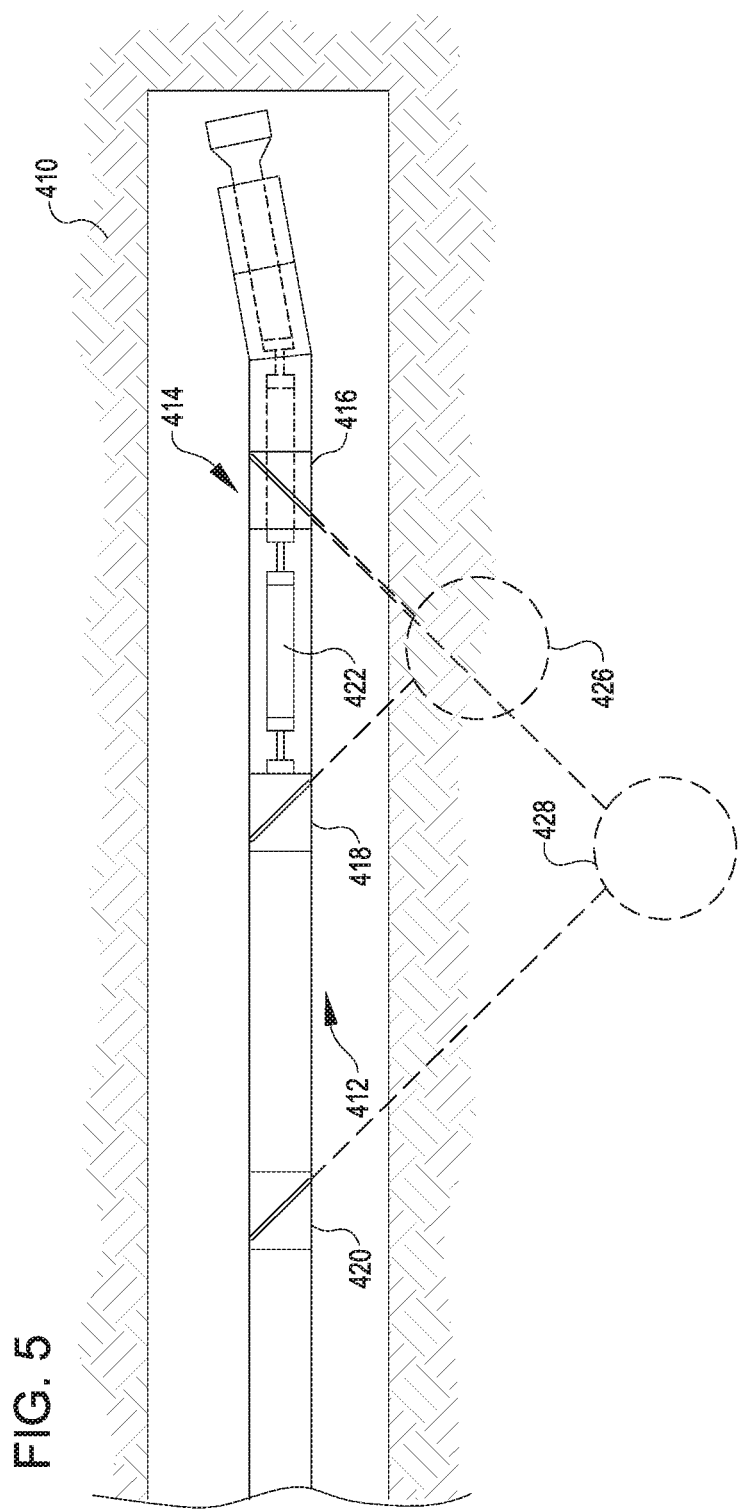

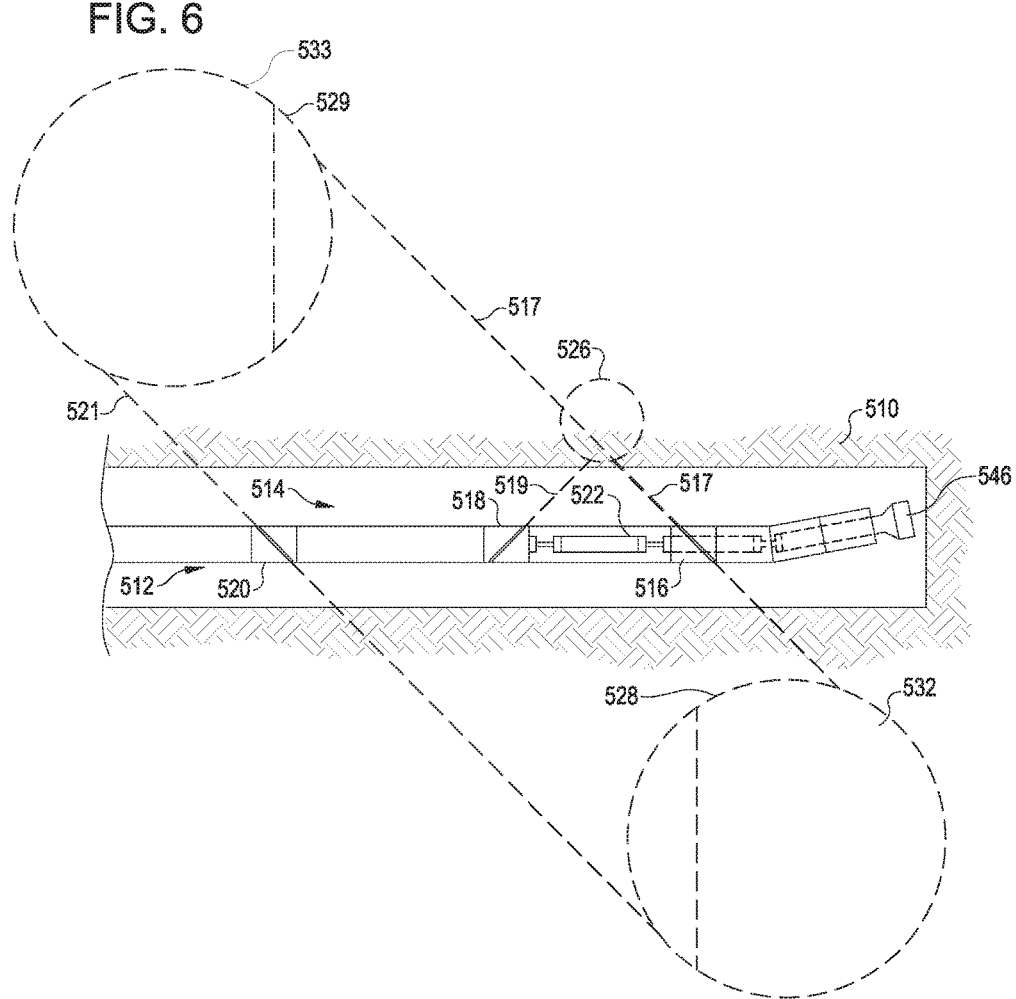

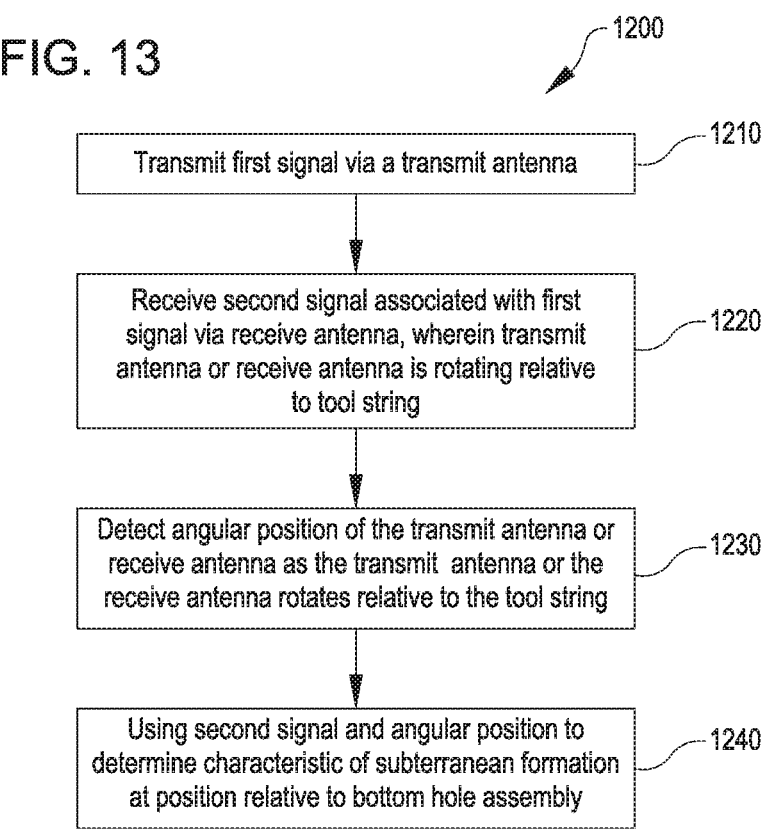

ROTATABLE SENSORS FOR MEASURING CHARACTERISTICS OF SUBTERRANEAN FORMATION

CROSS-REFERENCE TO RELATED APPLICATIONS

This is a divisional of U.S. patent application Ser. No. 14/429,068 filed Mar. 18, 2015 (allowed), which is a national phase entry under 35 USC § 371 of International Patent Application No. PCT/US2014/032520 filed Apr. 1, 2014, the entireties of which are incorporated herein by reference.

TECHNICAL FIELD

The present disclosure relates generally to devices for use in a wellbore in a subterranean formation and, more particularly to sensor assemblies for measuring anisotropic characteristics of a subterranean formation.

BACKGROUND

Various devices can be placed in a well traversing a hydrocarbon bearing subterranean formation. Some devices can include sensors capable of measuring attributes (e.g., resistivity) of the subterranean formation. Measurements can be used to determine characteristics (e.g., composition) of the subterranean formation. In some operations, the number of measurements that can be obtained is limited. Greater numbers of measurements can provide more detailed analysis, which can lead to greater efficiency or cost effective well operations.

BRIEF DESCRIPTION OF THE DRAWINGS

FIG. 2 is a diagram illustrating an example of a bottom hole sensor assembly with rotatable antennas according to one aspect of the present disclosure.

FIG. 3 is another diagram illustrating the bottom hole sensor assembly of FIG. 2 according to one aspect of the present disclosure.

FIG. 4 is a diagram illustrating an example of a bottom hole sensor assembly with an orientation sensor according to one aspect of the present disclosure.

FIG. 5 is a diagram illustrating an example of a bottom hole sensor assembly with multiple receive antennas according to one aspect of the present disclosure.

FIG. 6 is a diagram illustrating an example of a bottom hole sensor assembly with receive antennas oriented at different tilt angles according to one aspect of the present disclosure.

FIG. 13 is a flow chart illustrating an example method for measuring anisotropic characteristics of a subterranean formation according to one aspect of the present disclosure.

DETAILED DESCRIPTION

Certain aspects and examples of the present disclosure are directed to sensor assemblies for measuring anisotropic, or directionally-dependent, characteristics of a subterranean formation. Sensor assemblies can include sensors deployed on a tool string. One or more of the sensors can be rotatable relative to the tool string. Rotating one or more sensors relative to the tool string can provide data about the subterranean formation at multiple zones around the tool string.

In one example, a rotatable antenna on a drill string may rotate about the drill string for transmitting or receiving signals to determine resistivity at various angles in the formation. The rotation of the rotatable antenna, independent from any rotation of the drill string, can provide resistivity readings at multiple angles regardless of whether the drill string is rotating for drilling. The multiple directional resistivity readings can indicate boundaries of formation layers near the drill string. A drill string operator may utilize the readings as navigation aids in steering the direction of a new borehole being drilled for optimal well bore placement with respect to the location of boundaries, faults, calcite lens, or other natural or man-made subterranean structures.

These illustrative examples are given to introduce the reader to the general subject matter discussed here and are not intended to limit the scope of the disclosed concepts. The following describes various additional aspects and examples with reference to the drawings in which like numerals indicate like elements, and directional descriptions are used to describe the illustrative aspects. The following uses directional descriptions such as "above," "below," "upper," "lower," "left," "right," "downhole," etc. in relation to the illustrative aspects as they are depicted in the figures, the downhole direction being toward the toe of the well. Like the illustrative aspects, the numerals and directional descriptions included in the following should not be used to limit the present disclosure. Furthermore, the following uses the term "or" to denote any combination of options separated by the term "or", including combinations in which only one of the options is utilized and combinations in which more than one (and in some cases, all) of the options are utilized.

Figure 1:
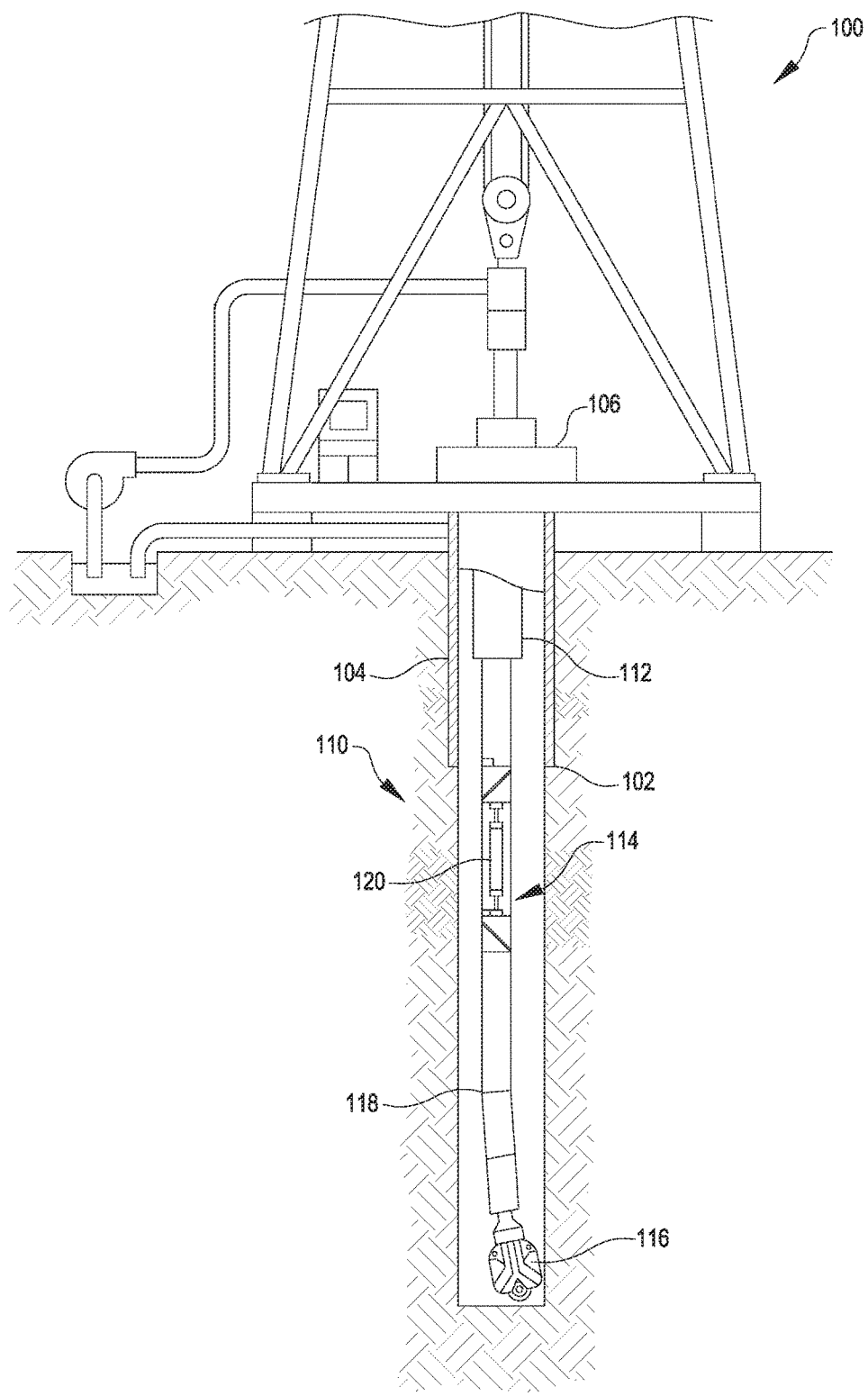
FIG. 1 is a diagram illustrating a drilling system, according to one aspect of the present disclosure.

FIG. 1 schematically depicts an example of a well system 100 having a bottom hole sensor assembly 114. The well system 100 can include a bore that is a wellbore 102 extending through various earth strata. The wellbore 102 can extend through a hydrocarbon bearing subterranean formation 110. A casing string 104 can extend from the surface 106 to the subterranean formation 110. The casing string 104 can provide a conduit via which formation fluids, such as production fluids produced from the subterranean formation 110, can travel from the wellbore 102 to the surface 106.

A tool string 112 within the wellbore 102 can extend from the surface into the subterranean formation 110. In some aspects, the tool string 112 can include a drill bit 116 introduced into the well system 100 for drilling the wellbore 102 through the various earth strata. In other aspects, the tool string 112 can be introduced without the drill bit 116. As a non-limiting example of a tool string 112 without a drill bit 116, the tool string 112 may be part of a wireline tool utilized for downhole well operations. The tool string 112 can include a bottom hole (or downhole) sensor assembly 114. Although FIG. 1 depicts the bottom hole sensor assembly 114 in section of the wellbore 102 that is substantially vertical, the bottom hole sensor assembly 114 can be located, additionally or alternatively, in sections of the wellbore 102 that have other orientations, including substantially horizontal. In some aspects, the bottom hole sensor assembly 114 can be disposed in simpler wellbores, such as wellbores 102 without a casing string 104.

In some aspects, the tool string 112 can include a bent housing 118. Examples of the bent housing 118 include a fixed bent housing or an adjustable bent housing. The bent housing 118 can provide steering for the drill bit 116. The bent housing 118 can allow drilling to proceed ahead in a certain direction in response to the tool string 112 rotating. Ceasing rotation of the tool string 112 can allow the bent housing 118 to change the drilling direction of the tool string 112. A motor 120 can rotate the drill bit 116 while the tool string 112 slides ahead through the formation 110 without the tool string 112 and bent housing 118 rotating. The tool string 112 can slide in the direction at which the bent housing 118 is facing, often called the tool face, as the motor 120 rotates the drill bit 116 on the bottom of the hole without the tool string 212 and bent housing 118 rotating. Sliding the tool string 112 can allow course adjustments in a drilling path. Resuming rotation of the tool string 212 can cause the tool string 212 to cease course adjustment and continue moving in the adjusted direction.

Different types of bottom hole sensor assemblies 114 can be used in the well system 100 depicted in FIG. 1. For example, FIG. 2 is a cross-sectional side view of an example of a bottom hole sensor assembly 214 with rotatable antennas 216, 218 according to one aspect. The bottom hole sensor assembly 214 can include a tool string 212, a rotatable transmit antenna 216, a rotatable receive antenna 218, a motor 222, a first angular position sensor 224, and a second angular position sensor 225.

The rotatable transmit antenna 216 or the rotatable receive antenna 218 can be rotatively coupled with the tool string 212. The rotatable transmit antenna 216 or the rotatable receive antenna 218 can rotate relative to the tool string 212. The rotatable transmit antenna 216 and the rotatable receive antenna 218 can together measure a characteristic within a region of the formation 210. The rotatable transmit antenna 216 can emit signals into the formation 210. The rotatable receive antenna 218 can detect responses in the formation 210 to the emitted signals. A sensitive volume 226 can define a region of the formation 210 in which the rotatable receive antenna 218 can detect a relatively largest portion of the responses to the signals emitted by the rotatable transmit antenna 216.

The rotatable transmit antenna 216 and the rotatable receive antenna 218 can be induction-type antennas. The direction of the signals emitted into or received from the formation 210 by an induction-type antenna can depend on an orientation of an equivalent dipole of the induction-type antenna. A tilt angle can represent the deviation of the dipole orientation from an axial direction of the tool string 212. The tilt angles of a pair of induction-type antennas can affect the position of a sensitive volume measured by the pair of induction-type antennas. For example, the position of the sensitive volume 226 relative to the tool string 212 can depend on the tilt angle of the rotatable transmit antenna 216 and the tilt angle of the rotatable receive antenna 218, as depicted in FIG. 2.

Examples of induction-type antenna include a solenoid, a magnetometer, and a coil. A tilt angle of a solenoid antenna can be produced by adjusting an elevation angle of a ferromagnetic core in the solenoid. A tilt angle of a magnetometer antenna can be produced according to the orientation at which the magnetometer antenna is mounted onto or into the bottom hole sensor assembly 214. A tilt angle of a coil antenna can be produced by winding the coil at an angle relative to the axial direction of the tool string 212. For example, the rotatable transmit antenna 216 can include a wire winding 215 arranged in a plane of winding 217 that is oriented approximately perpendicular to an equivalent dipole of the wire winding 215, as depicted in FIG. 2. The rotatable receive antenna 218 can include a wire winding 213 arranged in a plane of winding 219 that is oriented approximately perpendicular to an equivalent dipole of the wire winding 213, as depicted in FIG. 2.

Various relative arrangements of transmit and receive antennas are possible. Transmit and receive antennas can be perpendicular to each other, such that the tilt angle of a transmit antenna and a receive antenna differ by substantially 90 degrees. Transmit and receive antennas can be parallel to each other, such that the tilt angle of a transmit antenna and a receive antenna are substantially the same. It is also possible for the tilt angle of one of the transmit antenna or the receive antenna to be substantially equal to zero, Although the bottom hole sensor assembly 214 is described above as including a rotatable transmit antenna 216 and a rotatable receive antenna 218, the bottom hole sensor assembly 214 can alternatively or additionally include one or more other sensors rotatable relative to the tool string 212. In some aspects, the sensor rotatable relative to the tool string 212 can be an azimuthal sensor or a sensor that is directionally dependent. Non-limiting examples of azimuthal sensors include the aforementioned antennas, as well as resistivity sensors, gamma ray sensors, acoustic sensors, nuclear magnetic resonance sensors, and density sensors. Notwithstanding the suitability of these azimuthal sensors or other sensors, for the sake of simplicity and clarity, aspects herein are primarily described with respect to antennas. Also, although many aspects described herein include multiple sensors rotatable relative to the tool string 212, in some aspects, only one azimuthal sensor is rotatable relative to the tool string 212.

The motor 222 can be coupled with the rotatable transmit antenna 216 or the rotatable receive antenna 218. In one example, the rotatable transmit antenna 216 and the rotatable receive antenna 218 can be coupled to a shaft 230 driven by the motor 222. The rotatable transmit antenna 216 or the rotatable receive antenna 218 can rotate relative to the tool string 212 in response to the motor 222 rotating. In some aspects, the motor 222 can be dedicated for rotating the rotatable transmit antenna 216 or the rotatable receive antenna 218. In other aspects, the motor 222 can also provide other functions. In one example, the motor 222 can be coupled with a drill bit portion of a drill string and provide power for rotating drill bits without rotating the remainder of the drill string.

The motor 222 can be any suitable form of torsion power unit. Examples of torsion power units include a mud motor, a turbine motor, an electric motor, a Tubodrill motor, a vane motor, an air-powered motor, and a fluid-powered motor. In some aspects, a torsion power unit can be a hydraulic powered motor powered by a hydraulic pump. The pump can be powered by any suitable energy source. Examples of suitable energy sources for such a pump include electric power conveyed via a pipe (such as wired pipe or a pipe in pipe system such as is available under the trade name Reelwell™), electric power from local power generation (such as from a turbine-powered generator or other form of energy harvesting device downhole), or electric power from an energy storage device (such as batteries, rechargeable batteries, capacitors, or super capacitors).

In some aspects, the angular position sensors 224, 225 can be positioned for rotating respectively with the rotatable transmit antenna 216 or the rotatable receive antenna 218. In one example, the first angular position sensor 224 and the rotatable transmit antenna 216 can be located on a shared housing that is rotatable relative to the tool string 212. The first angular position sensor 224 can detect an orientation of the rotatable transmit antenna 216. For example, the first angular position sensor 224 may have a known rotational relationship with the rotatable transmit antenna 216 that allows the orientation of the rotatable transmit antenna 216 to be determined based on a known rotational location of the first angular position sensor 224. The second angular position sensor 225 can detect an orientation of the rotatable receive antenna 218. The orientation of the rotatable transmit antenna 216 or the rotatable receive antenna 218 (or both) can indicate the position of the sensitive volume 226 in the formation 210 relative to the tool string 212 at a particular time.

In some aspects, the first angular position sensor 224 or the second angular position sensor 225 can measure an orientation or angular position of an antenna that is stationary relative to the tool string 212. The first angular position sensor 224 or the second angular position sensor 225 can additionally or alternatively measure a changing orientation of an antenna that is rotating relative to the tool string 212. In one example, the first angular position sensor 224 can measure an orientation when the rotatable transmit antenna 216 is rotating relative to the tool string 212 in response to rotating the motor 222 and the second angular position sensor 225 can measure an orientation of the rotatable receive antenna 218 that is stationary relative to the tool string 212 and not rotating with the motor 222.

The orientation detected by the angular position sensor 224 or 225 can indicate a radial direction of a reference point of an antenna relative to an angular reference. The angular position sensors 224, 225 can use any suitable angular reference for indicating the orientation of the rotatable transmit antenna 216 or the rotatable receive antenna 218. In some aspects, the angular reference can be relative to gravity, a scribe line of the tool string 212, another reference feature of the tool string 212, or a northing, such as a true north or a magnetic north. In one example of an angular reference relative to gravity, the first angular position sensor 224 can measure the orientation of the rotatable transmit antenna 216 relative to a top side of an inclined borehole, which may also be referred to as a high side of the borehole.

The angular position sensor 224 or 225 can include one or more survey direction sensors. The angular position sensor 224 or 225 can use any suitable type or combination of survey direction sensors. Examples of survey direction sensors include accelerometers, magnetometers, and gyroscopes. In one example, an angular position sensor 224 or 225 can include two accelerometers orthogonally oriented along X-Y axes that are cross plane to the longitudinal axis of the tool string 212. Each accelerometer can detect a fraction of the earth's gravitational field according to the orientation of the accelerometer. The values detected by the accelerometers can indicate the orientation of the angular position sensor 224 or 225, such as a deviation from a reference direction of up or down. In another example, an angular position sensor 224 or 225 can include two magnetometers orthogonally oriented on the X-Y axes. The magnetometers can measure the Earth's magnetic field from different orientations to determine the direction of magnetic north and the deviation of the angular position sensor 224 or 225 therefrom. In a further example, the angular position sensor 224 or 225 can include a gyroscope which measures the deviation of the angular position sensor 224 or 225 from the spin axis of the earth (e.g. true north) or a referenced direction. In some aspects, a combination of survey direction sensors can be used together to aid in further resolving horizontal and vertical planes relative to the borehole. In one example, either a gyroscope or an X-Y magnetometer arrangement may be complemented with an X-Y axis accelerometer arrangement. In some aspects, additional survey direction sensors of the same or different type can be included to provide additional orientation information. In one example, a sensor that measures along the Z-axis (e.g., along the longitudinal axis of the tool string 212) may be included to reduce errors in resolving the direction of the vertical or horizontal planes (or both) relative to the down direction, such as in circumstances in which resolution is poor on the X-axis, Y-axis, or both.

FIG. 3 is a cross-sectional side view of the bottom hole sensor assembly 214 of FIG. 2 with rotated antennas 216, 218 according to one aspect. Rotating the motor 222 (such as depicted by the counterclockwise arrow 228 in FIG. 3) can cause the rotatable transmit antenna 216 or the rotatable receive antenna 218 to rotate relative to the tool string 212. Rotating the rotatable transmit antenna 216 or the rotatable receive antenna 218 can shift the position of the sensitive volume 226 of the formation 210 measured by the rotatable transmit antenna 216 and the rotatable receive antenna 218. For example, the sensitive volume 226 can be rotated from a position in the formation 210 above the tool string 212 (such as depicted in FIG. 2) to a position in the formation 210 below the tool string 212 (such as depicted in FIG. 3). The sensitive volume 226 can be moved without rotation of the tool string 212. Rotating the position of the sensitive volume 226 without rotating the tool string 212 can provide more data about the formation 210 than would otherwise be provided without rotating the tool string 212. In one example, resistivity information about the formation 210 can be obtained at various points around the tool string 212 while the tool string 212 is sliding for course adjustment. The resistivity information can be presented to an operator of the tool string 212 for indicating a proximity to a boundary between water-bearing earth strata and hydrocarbon-bearing earth strata.

In another example, rotating the position of the sensitive volume 226 without rotating the tool string 212 can provide data about the direction and distance to a subterranean man-made object such as another well, another borehole, or a lost drill string. For example, by detecting variations in the surrounding volume (such as resistivity changes), the location of a man-made object (such as an electrically conductive casing that has a lower resistivity than the surrounding formation) may be determined.

In some aspects, the rotatable transmit antenna 216 or the rotatable receive antenna 218 can be selectively rotatively coupled with the tool string 212. In one example, the rotatable transmit antenna 216 can be locked to the tool string 212 to prevent rotation of the rotatable transmit antenna 216 relative to the tool string 212. In some aspects, the rotatable transmit antenna 216 or the rotatable receive antenna 218 can rotate relative to the tool string 212 in a direction opposite to a direction in which the tool string 212 rotates during drilling. An opposite direction of rotation can allow a rate of rotation of the rotatable antenna 216, 218 relative to the formation 210 to be less than a rate of rotation of the tool string 212 relative to the formation 210.

Although the bottom hole sensor assembly 214 is depicted in FIGS. 2-3 with one rotatable transmit antenna 216 and one rotatable receive antenna 218 rotated by one motor 222, other arrangements are possible. For example, a bottom hole sensor assembly may include a transmit antenna that is rotatable and a receive antenna that is not rotatable or vice versa. A pair of antennas in which only one of the antennas is rotatable may still provide a sensitive volume that is rotatable relative to the tool string without rotating the tool string. The bottom hole sensor assembly 214 can include multiple receive antennas, multiple transmit antennas, multiple motors, multiple angular position sensors, or any combination thereof.

Although the bottom hole sensor assembly 214 is depicted in FIGS. 2-3 with angular position sensors 224, 225 respectively positioned on shared housings for rotating with the rotatable transmit antenna 216 and the rotatable receive antenna 218, other arrangements are possible. For example, in some aspects, the angular position sensor 224 or 225 associated with an antenna can include a survey direction sensor that is not rotating at the same speed or direction as the antenna. In at least such arrangements, the angular position sensor may also include an orientation sensor that detects an orientation of the antenna relative to the object containing the survey direction sensor. The orientation sensor can detect an additional offset of the antenna from the orientation measured by the survey direction sensor in order to determine the orientation of the antenna relative to the angular reference. For example, FIG. 4 is a back cross-sectional view of an example of a bottom hole sensor assembly 314 with an orientation sensor 368 according to one aspect.

The bottom hole sensor assembly 314 can include a tool string 312, a housing 356, and an angular position sensor 324. The housing 356 can be rotatable relative to the tool string 312, such as depicted by the curved arrow 328 depicted in FIG. 4. The tool string 212 can include a bore 301. In some aspects, the bore 301 provides a flow path for fluids, such as drilling fluids or production fluids, to flow through the tool string 212. In additional or alternative aspects, motors, shafts, gears, or other components for rotating the housing 356 relative to the tool string 212 can be positioned within the bore 301. (Some example arrangements of such components are described below with respect to FIG. 7). The housing 356 can carry an antenna 316. Rotating the housing 356 relative to the tool string 312 can rotate the antenna 316 relative to the tool string 312. The angular position sensor 324 can provide information about an orientation of the antenna 316 relative to an angular reference that is separate from the tool string 312. Non-limiting examples of the angular reference include true north, magnetic north, and a downward direction corresponding to a direction in which gravity of the earth exerts the greatest pull.

The angular position sensor 324 can include a survey direction sensor 325. The survey direction sensor can be positioned on or in the tool string 312 rather than on the housing 356. The survey direction sensor can detect an angular position of the tool string 312 relative to the angular reference that is separate from the tool string 312. The angular position sensor 324 can also include an orientation sensor 368. The orientation sensor 368 can detect an angular position of the antenna 316 relative to the survey direction sensor 325. The orientation of the antenna 316 relative to the angular reference can be determined based on readings from the orientation sensor 368 and the survey direction sensor 325. For example, the angular offset of the antenna 316 from the survey direction sensor 325 (measured by the orientation sensor 368) can be combined with the angular offset of the survey direction sensor 325 from the angular reference (measured by the survey direction sensor 325) to yield a total angular offset of the antenna 316 from the angular reference. As an illustrative example, the survey direction sensor 325 may be a gyroscope that detects deviation of the tool string 312 from true north 399. The survey direction sensor 325 may detect that the tool string 312 is oriented at a 30-degree eastward deviation 397 from true north 399. The orientation sensor 368 may detect that the antenna 316 is oriented at a 60-degree eastward deviation 395 from the location of the survey direction sensor 325 on the tool string 312. The combined readings in such a scenario would indicate that the antenna 316 is oriented at a total eastward deviation 393 of 90 degrees from true north 399.

In some aspects, the orientation sensor 368 can include magnets 335, 345. The magnets 335, 345 can be arranged at regular intervals around the circumference of the tool string 212. The magnets 335, 345 can be arranged with dipoles aligned in a radial direction of the tool string 212 on the X-Y plane. A zero-point magnet 345 can have an inverted orientation relative to the remaining magnets 335. For example, the zero-point magnet 345 can be arranged with a South-North orientation in a radially inward direction if the remaining magnets 335 are arranged with a North-South orientation in a radially inward direction.

The zero-point magnet 345 can be aligned with (or at a known offset from) the survey direction sensor 325. For example, the zero-point magnet 345 can be aligned with or at a known offset from a scribe line 327 of the tool string 312. The scribe line 327 may identify a reference orientation position of the survey direction sensor 325 relative to the tool string 312. For example, a zero point of the survey direction sensor 325 can be at a known fixed offset from the scribe line 327. In some aspects, the known fixed offset from the scribe line 327 can be measured after the bottom hole sensor assembly 314 is fully assembled.

The orientation sensor 368 can also include one or more magnetometers 365 (such as a hall effect sensor). The magnetometer 365 can detect variations in magnetic field strength as the magnetometer 365 moves between adjacent magnets 335, 345. For example, the magnetometer 365 may detect spikes in magnetic field magnitude each time the magnetometer 365 is aligned with a magnet 335, 345. The inverted alignment of the zero-point magnet 345 can cause a spike in the opposite direction from the remaining magnets 335. The number of spikes since the opposite spike of the zero-point magnet 345 can provide a general indication of how far the magnetometer 365 has traveled past the zero-point magnet 345. The difference in magnitude from the most recent spike can indicate how far the magnetometer 365 has traveled from that spike and provide more precise location information when the magnetometer 365 is between magnets 335, 345. In some aspects, a gyroscope or interval timer can be used with the magnetometer 365 to provide additional approximation of intermediate positions between magnets 335, 345 based on sensed rotation speed versus time.

Although the orientation sensor 368 is depicted in FIG. 4 with the magnets 335, 345 carried by the tool string 312 and the magnetometers 365 carried by the housing 356, other arrangements are possible. In some aspects, the magnetometers 365 are carried by the tool string 312 and the magnets 335, 345 are carried by the housing 356. In some aspects, a combination of magnets 335, 345 and magnetometers 365 can be located on a combination of the tool string 312 and a motor shaft coupled with the housing 356 to rotate the housing 356 relative to the tool string 312. The motor shaft can be located in the bore 301 and coupled to the housing 356 in any suitable manner, including the example arrangement described below with respect to FIG. 7. An arrangement in which an orientation sensor 368 monitors rotation of the motor shaft can provide an alternate or additional indication of the angular position of the antenna based on a known relationship between rotation of the motor shaft and rotation of the housing.

In some aspects, including an orientation sensor 368 can reduce a cost of producing the bottom hole sensor assembly 314 by reducing a number of survey direction sensors 325 used in the bottom hole sensor assembly 314. In some aspects, positioning one or more survey direction sensors 325 to rotate with each rotating antenna 316 can reduce a complexity or increase an accuracy of the bottom hole sensor assembly 314. For example, a survey direction sensor 325 that rotates with an antenna 316 may directly provide information about the orientation of the antenna 316 relative to an angular reference. Directly obtaining orientation information may reduce or eliminate inaccuracies from changes in alignment amongst components arranged between the survey direction sensor 325 and the antenna 316, such as may occur as a result of drill string twist, threaded connection over-tightening during drilling, motor drive train twist, gear play variations, or other misalignment factors.

FIG. 5 is a cross-sectional side view of an example of a bottom hole sensor assembly 414 with multiple receive antennas 418, 420 according to one aspect of the present disclosure. The bottom hole sensor assembly 414 can include a tool string 412, a rotatable transmit antenna 416, a first rotatable receive antenna 418, a second rotatable receive antenna 420, and a motor 422.

The first rotatable receive antenna 418 and the second rotatable receive antenna 420 can be located along the tool string 412 at different lengths from the rotatable transmit antenna 416. The different lengths can cause the first rotatable receive antenna 418 and the second rotatable receive antenna 420 to align differently with the rotatable transmit antenna 416. The difference in alignment can allow the rotatable transmit antenna 416 to produce a first sensitive volume 426 in the formation 410 with the first rotatable receive antenna 418 and a second sensitive volume 428 with the second rotatable receive antenna 420. The first sensitive volume 426 can be positioned at a different depth of investigation than a depth of investigation of the second sensitive volume 428.

In some aspects, the bottom hole sensor assembly 414 can provide different depths of investigation simultaneously. For example, the rotatable transmit antenna 416 may emit multiple frequencies for obtaining multiple depths of investigation concurrently. In some aspects, the bottom hole sensor assembly 414 can provide different depths of investigation successively. For example, the bottom hole sensor assembly 414 may consistently broadcast a frequency via the rotatable transmit antenna 416. The bottom hole sensor assembly 414 may obtain a first depth of investigation by activating the first rotatable receive antenna 418 without activating the second rotatable receive antenna 420. The bottom hole sensor assembly 414 may obtain a second depth of investigation by deactivating the first rotatable receive antenna 418 and activating the second rotatable receive antenna 420.

The rotatable transmit antenna 416, the first rotatable receive antenna 418, and the second rotatable receive antenna 420 can rotate relative to the tool string 412 in response to rotation of the motor 422. Rotating the first sensitive volume 426 and the second sensitive volume 428 relative to the tool string 412 can provide more diverse depths of investigation, improved vertical resolution of data, compensation for variations in data, or any combination thereof.

FIG. 6 is a cross-sectional side view of an example of a bottom hole sensor assembly 514 with receive antennas 518, 520 oriented at different tilt angles according to one aspect. The bottom hole sensor assembly 514 can include a rotatable transmit antenna 516, a first rotatable receive antenna 518, and a second rotatable receive antenna 520 positioned along a tool string 512.

The tool string 512 can have a downhole end 546. In some aspects, a drill bit can be positioned at the downhole end 546. The tool string 512 can travel in a direction through the formation 510. For example, the tool string 512 may travel in a substantially horizontal direction, as depicted by the rightward arrow in FIG. 6.

The first rotatable receive antenna 518 can be oriented with a plane of winding 519 positioned at a tilt angle that is substantially perpendicular to a tilt angle of a plane of winding 517 of the rotatable transmit antenna 516. The perpendicular orientation can produce a first sensitive volume 526 positioned between the rotatable transmit antenna 516 and the first rotatable receive antenna 518. The first sensitive volume 526 can provide information about a portion of the formation 510 that is positioned laterally to the tool string 512. For example, the first sensitive volume 526 can be positioned below the horizontal direction of travel of the tool string 512, as depicted in FIG. 6.

The second rotatable receive antenna 520 can have a plane of winding 521 oriented at a tilt angle that is substantially parallel to a tilt angle of the plane of winding 517 of the rotatable transmit antenna 516. The parallel orientation can produce a second sensitive volume 528 and a third sensitive volume 529. The second sensitive volume 528 can include a portion 532 that extends beyond the rotatable transmit antenna 516 and away from the second rotatable receive antenna 520. For example, the second sensitive volume 528 can include a portion 532 that extends ahead (e.g., depicted toward the right in FIG. 6) of the rotatable transmit antenna 516. In some aspects, the second sensitive volume 528 from a parallel orientation can extend ahead of the downhole end 546 of the tool string 512. In one example, a parallel orientation can provide information about a region that is ahead of a drill bit in a drill string. In some aspects, positioning an antenna closer to the downhole end 546 of the tool string 512 can increase a distance ahead of the downhole end 546 that can be detected. For example, the rotatable transmit antenna 516 can be positioned downhole of a motor 522 that causes rotation of one or more antennas relative to the tool string 512. The third sensitive volume 529 can include a portion 533 that extends beyond the second rotatable receive antenna 520 and away from the rotatable transmit antenna 516. For example, the third sensitive volume 529 can include a portion 533 that extends behind (e.g., depicted toward the left in FIG. 6) of the second rotatable receive antenna 520.

A perpendicular tilt angle orientation can provide a first sensitive volume 526 that is smaller than a second sensitive volume 528 provided by a parallel tilt angle orientation. The smaller size of the first sensitive volume 526 can provide readings with a higher resolution than readings provided by the second sensitive volume 528. The larger size of the second sensitive volume 528 can provide readings that correspond to regions of the formation 510 that are further away from the tool string 512 than readings provided by the first sensitive volume 526. Combining the shallower readings of the first sensitive volume 526 and the deeper readings of the second sensitive volume 528 can provide a profile of a characteristic of the formation 510 radially around the tool string 512. A profile of a characteristic of the formation 510 can improve interpretation or identification of boundaries of differing layers in the formation 510.

Figure 7:
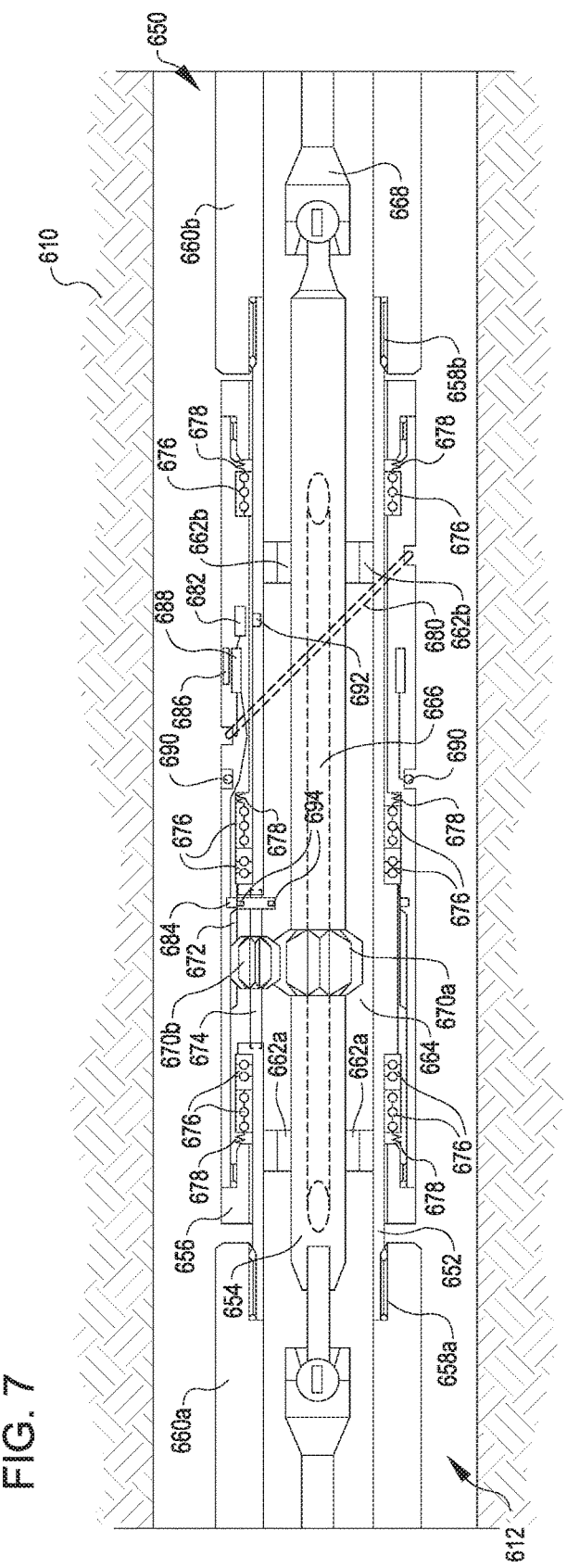
FIG. 7 is a diagram illustrating an example of a rotatable sensor assembly according to one aspect of the present disclosure.

FIG. 7 is a cross-sectional side view of an example of a rotatable sensor assembly 650 according to one aspect. The rotatable sensor assembly 650 can rotate a sensor relative to a tool string 612 such as the rotatable sensors described above with respect to FIGS. 2-6. The rotatable sensor assembly 650 can include a body 652, a shaft 654, and a housing 656.

The body 652 can be part of a tool string 612. The body 652 may include coupling features 658a, 658b for connection with other portions 660a, 660b of the tool string 612. For example, coupling features 658a, 658b can be threaded surfaces.

The shaft 654 can be positioned within the body 652. The shaft 654 can be supported relative to the body 652 by bearing assemblies 662a, 662b. Bearing assemblies 662a, 662b can allow shaft 654 to rotate relative to the body 652. In some aspects, the bearing assemblies 662a, 662b can restrict passage of fluid. In one example, the bearing assemblies 662a, 662b seal a chamber 664 around the shaft 654. In another example, the bearing assemblies 662a, 662b allow some passage of fluid for lubrication of components within the chamber 664. In some aspects, the shaft 654 can include an internal passageway 666. The passageway 666 can allow fluid to flow through the shaft 654 from one end of the chamber 664 to the other. For example, the passageway 666 may provide a path for drilling fluids to reach and provide power to a mud motor in a drilling operation.

The shaft 654 can be coupled to a motor, such as a motor 222 described above with respect to FIG. 2. In one example, the shaft 654 can be connected to a mud motor via a continuous velocity joint 668. In another example, the shaft 654 may be the rotor of the motor. The shaft 654 can rotate in response to operation of the motor. The shaft 654 can communicate torsional motion of the motor to other objects. In some aspects, the shaft 654 can be linked with a coupling 670 to communicate torsional motion to an object located in an axial direction from the shaft 654. In one example, the shaft 654 can be linked by the coupling 670 to cause rotation of the shaft 654 of another rotatable sensor assembly 650 for synchronized rotation of the rotatable sensor assemblies.

The housing 656 can be torsionally coupled with the shaft 654 such that rotation of the shaft 654 causes rotation of the housing 656. For example, the shaft 654 can be torsionally coupled with the housing 656 via one or more gears 670a, 670b. The housing 656 can include a gear surface 672 for engaging the gears 670a, 670b. In one example, a gear 670a affixed to the shaft 654 can engage a planetary gear 670b. The planetary gear 670b can be affixed to a planetary shaft 674 that is supported by the body 652. Although only one planetary gear 670b and one planetary shaft 674 is depicted in FIG. 7, multiple planetary gears 670b and planetary shafts 674 can be positioned radially about the shaft 654. The one or more planetary gears 670b can engage the gear surface 672 on the housing 656 and the gear 670a affixed to the shaft 654 to transfer rotational motion between the shaft 654 and the housing 656.

In some aspects, bearings 676 can be positioned between the housing 656 and the body 652. The bearings 676 can be radial bearings, axial bearings, or some combination thereof. A combination of axial and radial bearings can allow the housing 656 to continue to rotate relative to the body 652 in the presence of external loads applied on the housing that might otherwise impede rotation. In some aspects, springs 678 or other biasing alignment devices can be positioned with the bearings 676 to maintain the bearings 676 in position under applied external loads.

The housing 656 can include a formation sensor 680, a body angular position sensor 682, a shaft angular position sensor 684, a survey direction sensor 686, an electronics package 688, and a communications device 690. Although the housing 656 is depicted in FIG. 7 with all of these components, in some aspects, one or more of these components can be omitted from the housing 656.

The formation sensor 680 can detect characteristics of a formation 610. For example, the formation sensor 680 can be a rotatable transmit antenna 216 or a rotatable receive antenna 218 as described above with respect to FIG. 2. In some aspects, the formation sensor 680 is a transceiver that can be switched between a transmitting mode and a receiving mode. In some aspects, the formation sensor 680 can be a directional sensor other than an antenna for detecting resistance in the formation. Non-limiting examples of such an alternative formation sensor 680 include a gamma ray sensor, an acoustic sensor, a nuclear magnetic resonance sensor, and a density sensor. All such sensors can be used additionally or alternatively for sensing characteristics of the formation or the direction and distance to sensed man-made objects within the formation, such as another well bore, well bore tubular or a lost in hole drill string. Although the rotatable sensor assembly 650 is depicted in FIG. 7 with a single formation sensor 680, other arrangements are possible. In some aspects, the rotatable sensor assembly 650 can include multiple formation sensors 680 or multiple distance and direction ranging sensors. These multiple formation sensors 680 or distance and ranging sensors may be of the same or different types from one another.

The body angular position sensor 682 can detect an angular position of the formation sensor 680 relative to the body 652 of the rotatable sensor assembly 650. For example, the body angular position sensor 682 may optically detect markers 692 positioned around the circumference of the body 652. The marker 692 detected at a particular time can indicate the angular position of the formation sensor 680 relative to the body 652 at the particular time.

The shaft angular position sensor 684 can detect an angular position of the formation sensor 680 relative to the shaft 654 of the rotatable sensor assembly 650. For example, the shaft angular position sensor 684 may detect a magnetic field of one or more magnets 694 coupled with the shaft 654 or a planetary shaft 674 (shown on coupled with a planetary shaft 674 in FIG. 7). The strength of the magnetic field detected at a particular time can indicate the angular position of the formation sensor 680 relative to the shaft 654 at the particular time.

The survey direction sensor 686 can detect an angular position of the survey direction sensor 686 relative to an angular reference distinct from the rotatable sensor assembly 650. For example, an angular position may be detected based on gravity, true north, or magnetic north, such as by one or more accelerometers, gyroscopes, or magnetometers. The strength or direction of readings detected by one or more of these components at a particular time can indicate an angular position or orientation of the survey direction sensor 686 relative to the angular reference.

Positioning the survey direction sensor 686 on the housing 656 with the formation sensor 680 can cause the angular position detected by the survey direction sensor 686 to directly correspond to the angular position of the formation sensor 680. For example, the angular deflection of the formation sensor 680 from the angular reference can be equal to the angular deflection detected by the survey direction sensor 686 or offset by a known amount corresponding to the manner in which the survey direction sensor 686 and the formation sensor 680 are aligned relative to one another on the housing 656.

In some aspects, the survey direction sensor 686 can be located in a location other than the housing 656, such as elsewhere in the tool string 612. In at least such arrangements the body angular position sensor 682 or the shaft angular position sensor 684 can determine the angular position of the formation sensor 680 relative to the survey direction sensor 686, much as the orientation sensor 368 (described above with respect to FIG. 4) can determine the angular position of the antenna 316 relative to the survey direction sensor 325. This angular position of the formation sensor 680 relative to the survey direction sensor 686 can be combined with the angular position of the survey direction sensor 686 to determine the orientation of the formation sensor 680 relative to the angular reference, much as the orientation of the antenna 316 relative to the angular reference can be determined based on readings from the orientation sensor 368 and the survey direction sensor 325 (described above with respect to FIG. 4).

The electronics package 688 can send or receive information to the various data producing sensors described above (e.g., the body angular position sensor 682, the shaft angular position sensor 684, the survey direction sensor 686, the formation sensor 680, or some combination thereof). The electronics package 688 may also provide a centralized time keeping function for synchronizing or synthesizing the timing of readings from the data producing sensors. In some aspects, one or more of the data producing sensors are integrated into the electronics package 688.

The electronics package 688 may include one or more components of an information handling system. As used herein, the term "information handling system" refers to a system including one or more processors coupled with a non-transitory memory device. Non-limiting examples of the memory device include RAM and ROM. The memory device can store machine-readable instructions executable by the one or more processors. When executed by a processor, the instructions can cause the processor to perform functions, which can include various of the functions described herein. As an illustrative example, an information handling system can be configured to perform functions described with respect to the electronics package 688 in the preceding paragraph and elsewhere herein. Furthermore, the term "information handling system" is not limited solely to the electronics package 688 described with reference to FIG. 7. Further non-limiting examples of information handling systems include microcontrollers, analog electronics, computing systems located at the surface, and combinations thereof.

The electronics package 688 can also send or receive information via the communications device 690. In one example, the communications device 690 can be a toroid for providing short hop communications over a wireless network to other devices in the bottom hole assembly, such as the bottom hole sensor assembly 214 or at any intermediate point in a drill string. Other examples of communications device 690 include an inductive coupler or a slip ring.

The electronics package 688, the data producing sensors, and the communications device 690 (or any combination thereof) can be powered by any suitable power source. In one example, the power source can be batteries included in the electronics package 688 in the housing 656. In another example, the power source can be located remotely from the housing 656 (such as elsewhere in a bottom hole assembly) and transferred to the housing 656 by a slip ring for communicating power from the body 652 to the housing 656.

Figure 8:
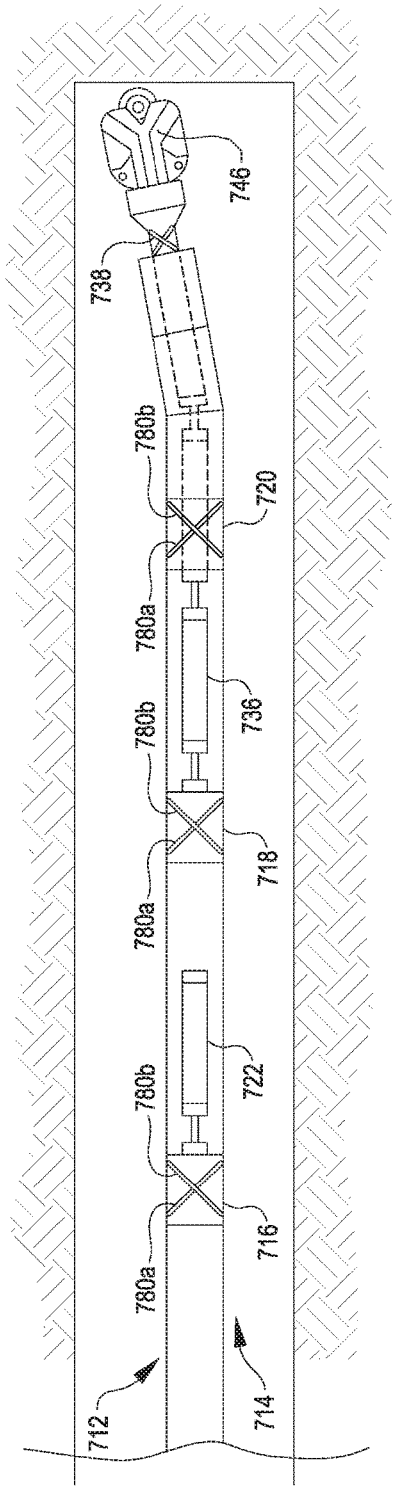
FIG. 8 is a diagram illustrating an example of a bottom hole sensor assembly with two motors according to one aspect of the present disclosure.

FIG. 8 is a cross-sectional side view of an example of a bottom hole sensor assembly 714 with two motors 722, 736 according to one aspect. The bottom hole sensor assembly 714 can include a first motor 722, a second motor 736, a first rotatable sensor assembly 716, a second rotatable sensor assembly 718, a third rotatable sensor assembly 720, a rotatable near-bit sensor assembly 738, and a drill bit 746 positioned along a tool string 712. In some aspects, the first rotatable sensor assembly 716, the second rotatable sensor assembly 718, and the third rotatable sensor assembly 720 can each be similar to the rotatable sensor assembly 650 described above with respect to FIG. 7.

The first rotatable sensor assembly 716 can be coupled with the first motor 722. The first motor 722 can cause the first rotatable sensor assembly 716 to rotate independently of the tool string 712 or the second motor 736. In one example, the second motor 736 can rotate the drill bit 746. The first motor 722 can allow the first rotatable sensor assembly 716 to be rotated at a rate independent from a rate of rotation of the drill bit 746. Independent rotation may allow a sweep rate of the first rotatable sensor assembly 716 to be optimized, such as based on a rate of penetration of a well being drilled.

The second motor 736 can be coupled with the second rotatable sensor assembly 718, the third rotatable sensor assembly 720, the rotatable near-bit sensor assembly 738, and the drill bit 746. Coupling multiple rotatable sensor assemblies 718, 720, 738 with a common motor 736 can allow the rotatable sensor assemblies 718, 720, 738 to rotate in synchronization. Synchronized rotation can allow simplified configurations of the bottom hole sensor assembly 714, such as configurations with reduced numbers of motors or angular position sensors.

One or more of the rotatable sensor assemblies 716, 718, 720, or 738 can include multiple sensors 780a, 780b. The multiple sensors 780a, 780b can be tilted relative to one another such that a different measurement can be made with the first sensor 780a than with the second sensor 780b. In one example, the multiple sensors 780a, 780b can be windings of an antenna arranged in planes of winding that are tilted relative to each other. A characteristic of a subterranean formation can be determined both at a first position in the first winding plane and at a second position in the second winding plane based on respective orientations of the receive antenna and the transmit antenna. In some aspects, the multiple sensors 780a, 780b can be arranged substantially perpendicular to each other.

Multiple sensors 780a, 780b in a rotatable sensor assembly 716, 718, 720, or 738 can provide a greater number of data points for calculating formation characteristics. For example, crossed antennas can provide more channels, i.e., measurements from a distinct transmitter and receiver combination. Crossed antennas can also allow synthesizing measurements from dipole angles that do not exist physically, such as by performing a weighted average of the responses from each of the crossed antennas.

Figure 9:
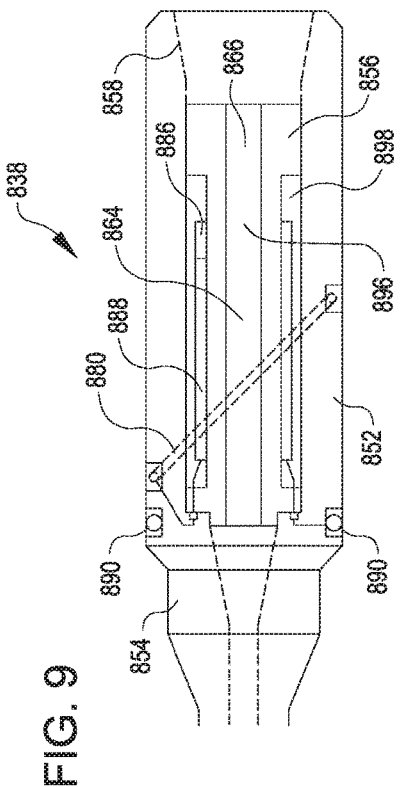
FIG. 9 is a diagram illustrating an example of a rotatable near-bit sensor assembly according to one aspect of the present disclosure.

The rotatable near-bit sensor assembly 738 can be different from the rotatable sensor assembly 650 described above with respect to FIG. 7. For example, FIG. 9 is a cross-sectional side view of an example of a rotatable near-bit sensor assembly 838 according to one aspect. The rotatable near-bit sensor assembly 838 can include a body 852, a shaft 854, and an electronics housing or insert 856. In some aspects, the rotatable near-bit sensor assembly 838 can be located near a downhole end of a tool string to provide a rotatable sensor for looking ahead of the downhole end of a tool string or ahead of a drill bit in a drill string.

The body 852 can be coupled with the shaft 854. The shaft 854 can be rotatable by a motor. The shaft 854 can include a passageway 866 through which drilling fluid can flow. The body 852 can have a hollow interior defining a chamber 864. The body 852 can include coupling features 858 for connection with other tools, such as a drill bit, other sensors, or a steering tool. In one example, the coupling features 858 can be threaded surfaces. Drilling fluid flowing through the shaft 854 can flow through the chamber 864 and through the coupling features 858. The body 852 can include a formation sensor 880 and a communications device 890.

The insert 856 can be installed into the chamber 864. The insert can include a central bore 896. The bore 896 can provide a path for drilling fluid to flow from the shaft 854 through the coupling features 858. The insert 856 can include a sealed volume 898. The sealed volume 898 can contain an electronics package 888. Installation of the insert 856 into the chamber 864 can establish electronic communication between the electronics package 888 and the formation sensor 880. Installation of the insert 856 into the chamber 864 can establish electronic communication between the electronics package 888 and the communications device 890. In some aspects, the electronics package 888 can include one or more angular position sensors 886 for determining an angular position of the formation sensor 880. The electronics package 888 can transmit information from the formation sensor 880 via the communications device 890.

Figure 10:
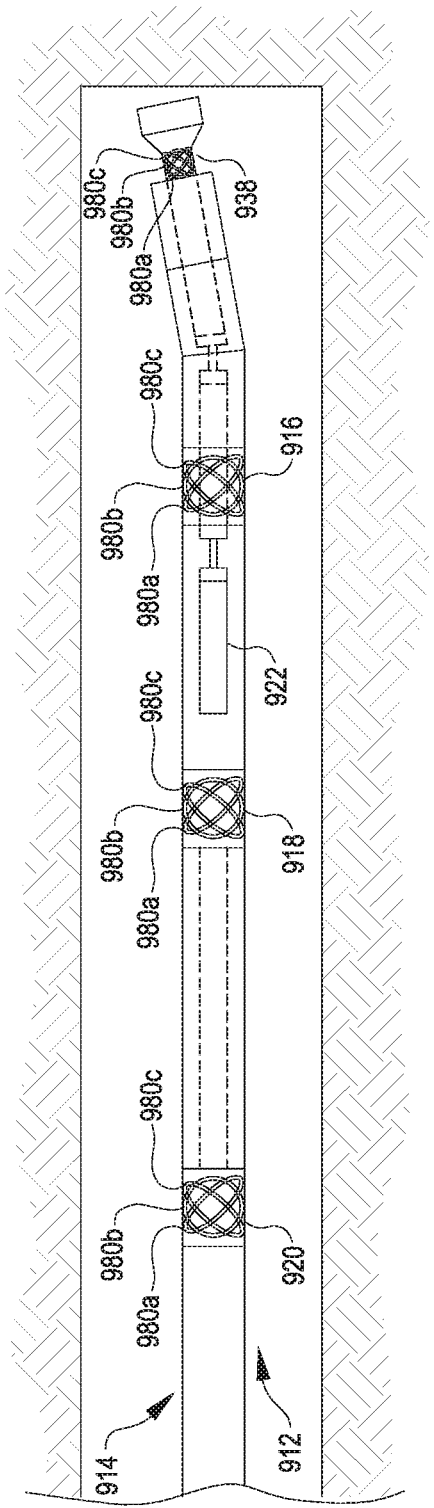
FIG. 10 is a diagram illustrating an example of a bottom hole sensor assembly with sensor assemblies, each having three formation sensors, according to one aspect of the present disclosure.

FIG. 10 is a cross-sectional side view of an example of a bottom hole sensor assembly 914 with sensor assemblies 916, 918, 920, 938 each having three formation sensors 980a, 980b, 980c according to one aspect. Sensor assemblies 916, 918, 920, 938 can include any number of crossed sensors 980a, 980b, 980c. Configurations with three crossed sensors 980a, 980b, 980c (such as depicted in FIG. 10) can provide more channels and data points than configurations with fewer crossed sensors 780a, 780b (such as depicted in FIG. 8). In some aspects, while a configuration of three crossed sensors 980a, 980b, 980c in the absence of rotation can provide sufficient data for precise measurements, rotating one or more of the sensor assemblies 916, 918, 920, 938 can provide additional data for reducing noise or otherwise improving the quality of information obtained from the rotatable sensor assemblies 916, 918, 920, 938.

In some aspects, fewer than all of the sensor assemblies 916, 918, 920, 938 are rotatable. For example, a motor 922 coupled with the sensor assemblies 916, 938 can cause the sensor assemblies 916, 938 to rotate while sensor assemblies 918, 920 remain stationary. Reducing the number of rotating sensors can reduce the complexity of the bottom hole sensor assembly 914 by reducing a number moving parts. In some aspects, the rotating sensor assemblies 916, 938 transmit and the stationary sensor assemblies 918, 920 receive. In other aspects, the stationary sensor assemblies 918, 920 transmit and the rotating sensor assemblies 916, 938 receive. The bottom hole sensor assembly 914 can include any combination of stationary or rotating sensor assemblies for transmitting and receiving. In some aspects, a rotatable sensor assembly (such as sensor assemblies 916, 938 depicted in FIG. 10) can be locked to the tool string 912 to stop or prevent rotation and temporarily convert the rotatable sensor assembly to a stationary sensor assembly.

Figure 11:
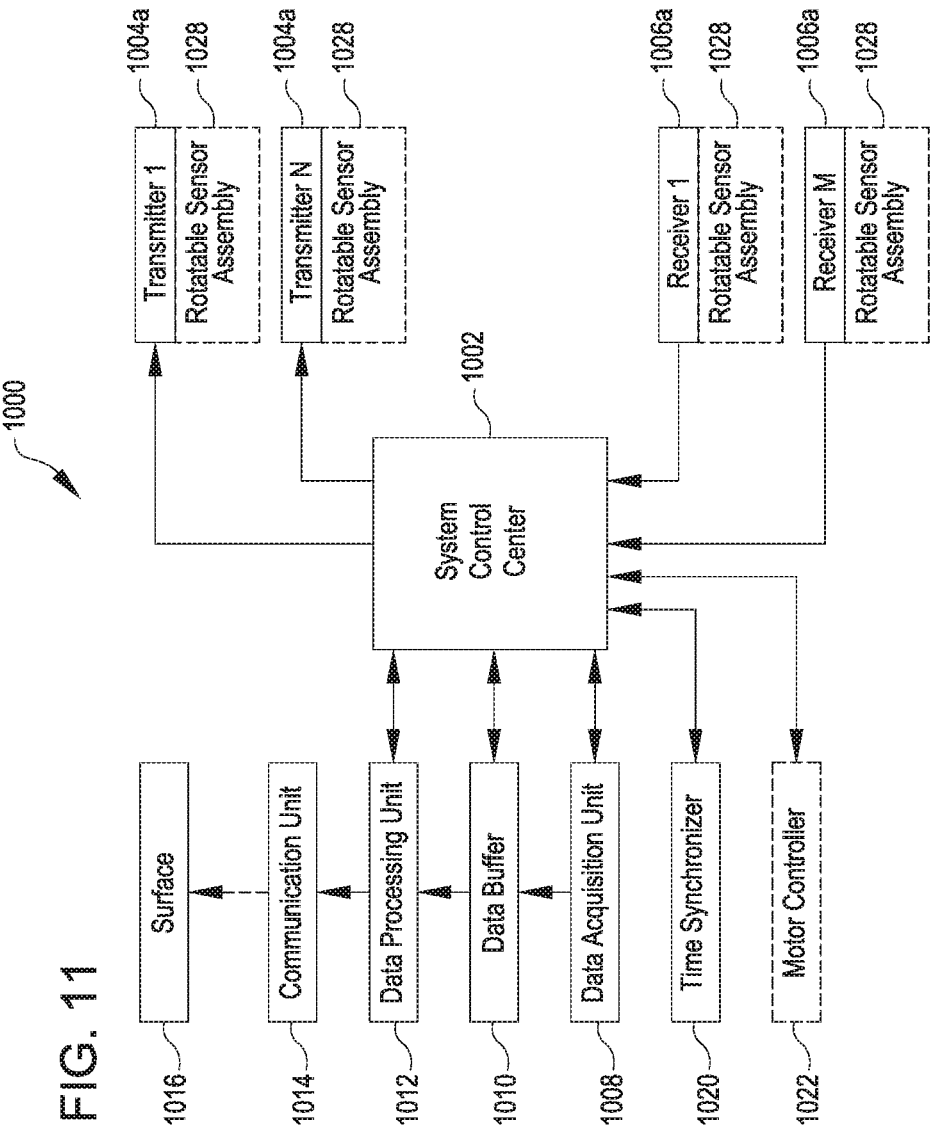
FIG. 11 is a block diagram of a control system for a bottom hole sensor assembly with rotatable sensors according to one aspect of the present disclosure.

FIG. 11 is a block diagram of a control system 1000 for a bottom hole sensor assembly with rotatable sensors according to one aspect. The bottom hole sensor assembly can include a system control center 1002, transmitters 1004a-n, receivers 1006a-m, a data acquisition unit 1008, a data buffer 1010, a data processing unit 1012, and a communication unit 1014, a time synchronizer 1020, and a motor controller 1022.

The system control center 1002 can form all or part of an information handling system, which may include or interface with other information handling systems described herein. For example, the system control center 1002 can include one or more processors or analog electronics. The system control center 1002 can manage the operation of other components in the control system 1000. A signal within a frequency in range 1 Hz to 10 MHz can be generated by the system control center 1002 and fed to a number of transmitters 1004a-n (any number "n" of transmitters 1004a-n can be included). In one example, the transmitters 1004a-n can include transmit antennas that can emit electromagnetic waves into the wellbore formation in response to currents passed through the antennas. In some aspects, any of the transmitters 1004a-n can include multiple transmit antennas connected to a single transmitter via a demultiplexer that is controlled via the system control center 1002. This may reduce the total number of transmitters 1004a-n, the size of electronics, and complexity of the control system 1000.

Receivers 1006a-m (any number "m" of receivers 1006a-m can be included) can receive an electromagnetic wave signal from the wellbore formation. In one example, the receivers 1006a-m include antennas. The received signal can be directed to the system control center 1002. Analogous to the transmitters 1004a-n with multiple transmit antennas, multiple receive antennas can be connected to the same receiver 1006a-m via a demultiplexer for efficiency. Multiple frequencies may be transmitted and received at the same time to increase functionality within a limited window of time. In one example, square or other time waveforms can excite multiple frequencies simultaneously at the transmitters 1004a-n. The frequencies can be separated by filters at the receiving end in the data acquisition unit 1008. Signals from each transmitter 1004a-n can be received at all receivers 1006a-m and recorded. The time synchronizer 1020 can include a clock or other device that can provide a consistent time reference for tracking when the various signals are emitted and received. The data buffer 1010 can store received signals for processing. The data processing unit 1012 can perform processing or inversion on the data to convert the signal information into data about characteristics of the wellbore formation. The inversion may be performed downhole, or in a computer at the surface 1016 after the data is transferred to the surface 1016. The communication unit 1014 can communicate the data or results to the surface 1016, such as to a control system located at the surface 1016. In one example, the data or results can be utilized to direct the direction of a drill string in a drilling operation, such as by providing information to a drill string operator via a visualization device at the surface or by providing information to an automated drill string guidance system. The communication unit 1014 can additionally or alternatively communicate the data or results to other tools downhole, e.g., to improve various aspects of locating and extracting hydrocarbons. The communication unit 1014 can include appropriate components or combinations thereof for communicating by any suitable form of telemetry, including but not limited to, any combination of electronic pulses, analog signals, amplitude modulated patterns, frequency modulated patterns, or electromagnetic waves, any of which may conveyed by any combination of wired, wireless, or mud-pulse transmissions.

The motor controller 1022 can control one or more motors used for rotating any of the transmitters 1004*a-n* or receivers 1006*a-m*. The motor controller 1022 can form all or part of an information handling system, which may include or interface with other information handling systems described herein. The motor controller 1022 can adjust the rate of rotation of the transmitters 1004*a-n* or receivers 1006*a-m* by controlling the rate of rotation of the associated motor(s). In some aspects, the motor controller 1022 can stop the rotation at a particular point to orient one or more of the transmitters 1004*a-n* or receivers 1006*a-m* in a particular direction for measuring a particular region of interest in the wellbore formation.

Figure 12:
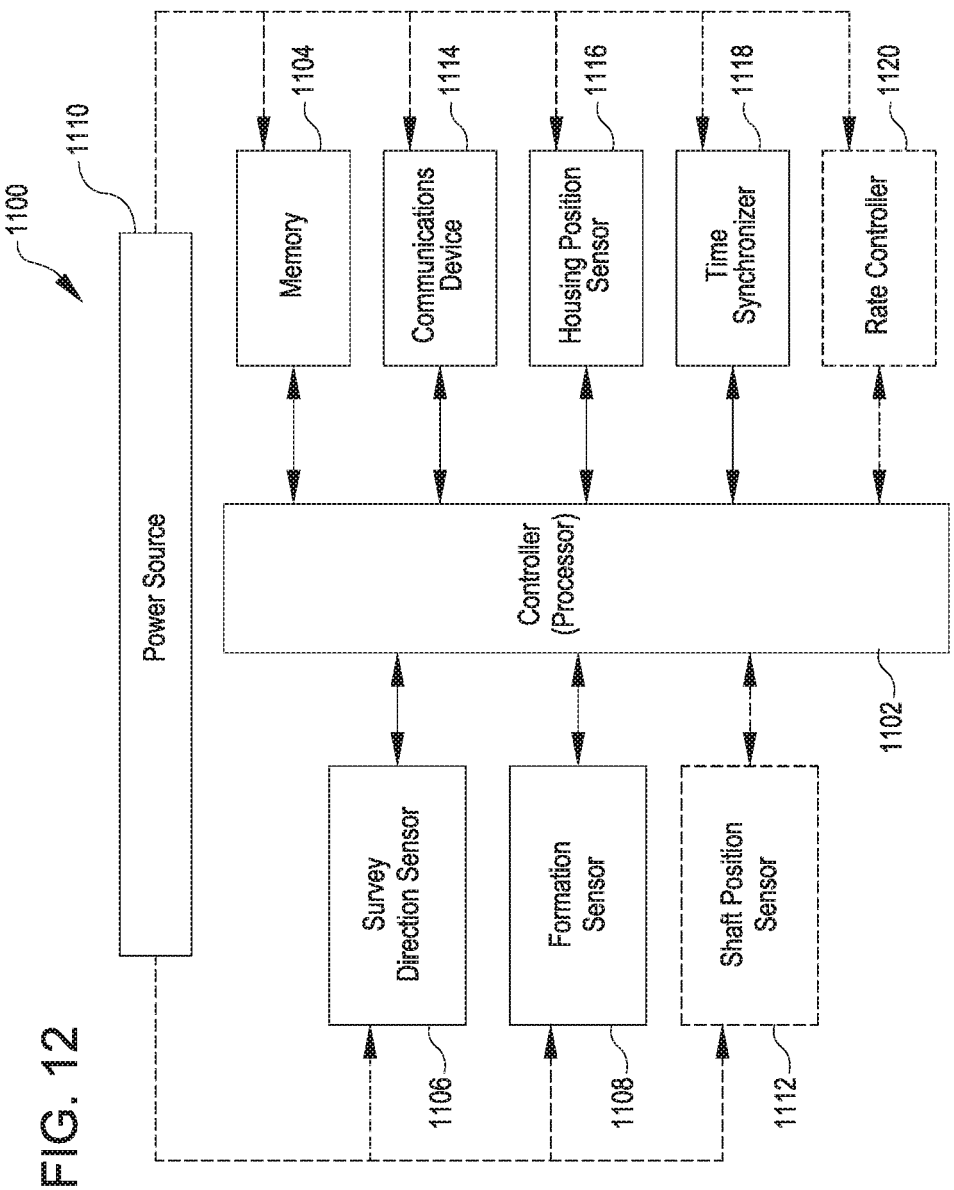
FIG. 12 is a block diagram of a control system for a rotatable sensor assembly according to one aspect of the present disclosure.

In some aspects, one or more of the transmitters 1004*a-n* or the receivers 1006*a-m* can correspond to a rotatable sensor assembly 1028. For example, a rotatable sensor assembly 1028 can be the rotatable sensor assembly 650 as described with respect to FIG. 7 above. FIG. 12 is a block diagram of a control system 1100 for a rotatable sensor assembly 1028 according to one aspect. The control system 1100 can form all or part of an information handling system, which may include or interface with other information handling systems described herein. The control system 1100 can include a controller 1102, memory 1104, a survey direction sensor 1106, a formation sensor 1108, a power source 1110, a shaft position sensor 1112, a communications device 1114, a housing position sensor 1116, a time synchronizer 1118, and a rate controller 1120. Although the control system 1100 for a rotatable sensor assembly 1028 is depicted in FIG. 12 with all of these listed components, in some aspects, one or more of these components can be omitted or incorporated directly as part of the control system 1000 depicted in FIG. 11.

The controller 1102 can form all or part of an information handling system, which may include or interface with other information handling systems described herein. For example, the controller 1102 can include a processor. The memory 1104 can store machine-readable instructions accessible by the controller 1102. The memory 1104 can store data retrievable after a well operation is completed. Storing data in memory 1104 can reduce an amount of data that is communicated to the surface during operation. The formation sensor 1108 can receive signals from the wellbore formation and provide related data to the controller 1102. For example, the formation sensor 1108 can be the formation sensor 680 described above with respect to FIG. 7.

The power source 1110 can provide electric power for the various electronics of the control system 1100. The power source 1110 can be any suitable power source, including batteries, a slip ring or other connection to a wire or other conduit to another power source at the surface or in the tool string, or a generator driven by drilling fluids or the differential rotation between the bottom hole assembly and the sensor housing (such as an alternator).

In some aspects, the memory 1104 can also store data to be organized and analyzed. For example, as formation sensors 680 rotate, the orientation of the azimuthal measurement can be binned in the memory 1104 and divided up into directional bins versus time or depth (or both). The hole depth may be known at the time of the azimuthal measurement or later added based on depth versus time data, which may be measured at the surface. The binned data can be used to correlate the measurement versus a depth and orientation. In this manner, an angular profile of the formation characteristics around the circumference of a tool string or bore hole can be measured while the azimuthal formation sensor 680 rotates.

The survey direction sensor 1106 can provide information about the orientation of the formation sensor 1108 to the controller 1102. The shaft position sensor 1112 can provide information to the controller 1102 about the position of the formation sensor 1108 relative to a rotating shaft (such as shaft 654 described above with respect to FIG. 7) that causes the formation sensor 1108 to rotate. The housing position sensor 1116 can provide information to the controller 1102 about the angular position relative to a tool string of a housing (such as housing 656 described above with respect to FIG. 7) supporting the formation sensor 1108. In some aspects, the survey direction sensor 1106 may provide direct information about the orientation of the formation sensor 1108, similar to the manner described above with respect to FIGS. 2-3, in which the angular position sensors 224 or 225 can be positioned for rotating respectively with the rotatable transmit antenna 216 or the rotatable receive antenna 218 to indicate an angular position thereof. In some aspects, the survey direction sensor 1106 may provide indirect information about the orientation of the formation sensor 1108 that can be supplemented by information from the shaft position sensor 1112 or the housing position sensor 1116, similar to the manner described above with respect to FIG. 5, in which data from the survey direction sensor 325 can be combined with data from the orientation sensor 368 to determine an angular position of the antenna 316.

The time synchronizer 1118 can include a clock or other time reference device. The time synchronizer can provide a common time scale for the controller 1102 for synthesizing the various measurements received from the various components. The controller 1102 can control a rate of rotation of the formation sensor 1108 via the rate controller 1120. For example, the rate controller 1120 can control the rotation rate of a motor rotating the formation sensor 1108. The rate controller 1120 can form all or part of an information handling system, which may include or interface with other information handling systems described herein.

The communications device 1114 can communicate information to or from the controller 1102. For example, the communications device 1114 can communicate information from the controller to the surface or to another tool in the tool string. One example of the communications device 1114 is a toroid for short hop communications, as discussed above with respect to FIG. 7. The toroid can wrap circumferentially around a carrier of the toroid. In some aspects, the communications device 1114 can communicate synthesized information or raw data about the formation sensor 1108 to the system control center 1002 (described above with respect to FIG. 11) as information about one or more of any of the transmitters 1004*a-n* or receivers 1006*a-m*.

FIG. 13 is a flow chart illustrating an example method 1200 for measuring anisotropic characteristics of a subterranean formation according to one aspect. The method can utilize a bottom hole sensor assembly as described herein, such as the bottom hole sensor assembly 214 described above with respect to FIGS. 2-3 or variations thereof, such as described with respect to other figures herein.

In block 1210, a first signal is transmitted via a transmit antenna. For example, the rotatable transmit antenna 216 can transmit the signal into the formation 210. In block 1220, a second signal associated with the first signal is received via a receive antenna. The first signal can be transmitted or the second signal can received as the transmit antenna or the receive antenna is rotating relative to the tool string. For example, the rotatable receive antenna 218 can receive a signal from the sensitive volume 226 of the formation 210 that corresponds to a response of the formation 210 to the first signal transmitted by the rotatable transmit antenna 216. The rotatable transmit antenna 216 or the rotatable receive antenna 218 may be rotating as the signals are transmitted or received.

In block 1230, an angular position of the transmit antenna or the receive antenna is detected as the transmit antenna or the receive antenna rotates relative to the tool string. For example, the angular position sensor 224 or 225 can detect the angular position in block 1230.

In block 1240, the second signal and the angular position can be used to determine a characteristic of the subterranean formation at a position relative to the bottom hole assembly. For example, the second signal can indicate a resistivity of the formation 210 in the sensitive volume 226 and the angular position can indicate the location of the sensitive volume 226 relative to the tool string 212.

In some aspects, signals from multiple transmitter and receiver pairs can be used in combination in determining the characteristic of the subterranean formation. Determination may be carried out by performing simulations with a formation characteristic value to produce modeled signals, computing a difference between the modeled signals and signals from the transmitter and receivers, and adjusting the formation characteristic value until a least difference is achieved. The formation characteristic value corresponding to the least difference may be accepted as final interpretation of the formation characteristic measured by the signals of the transmitter and receiver pairs.

In some aspects, a bottom hole assembly can be provided including a tool string and an azimuthal sensor rotatively coupled with the tool string such that the azimuthal sensor is rotatable relative to the tool string. In some aspects, a method can include rotating an azimuthal sensor relative to a tool string.

In some aspects, a bottom hole assembly, downhole system, a tool, or a method is provided according to one or more of the following examples. In some aspects, a tool, an assembly, or a system described in one or more of these examples can be utilized to perform a method described in one of the other examples.

Example #1

Provided can be a downhole assembly, comprising a tool string; a directionally-dependent transmitter coupled with the tool string; and a directionally-dependent receiver coupled with the tool string, wherein at least one of the directionally dependent receiver and the directionally dependent transmitter is rotatable relative to the tool string.

Example #2

Provided can be the downhole assembly of Example #1, further comprising at least one angular position sensor arranged with a known rotational relationship with the at least one of the transmitter or the receiver rotatable relative to the tool string. The receiver may receive signals having signal information. The at least one angular position sensor may detect an angular position of at least one of the transmitter or the receiver. The signal information and the angular position may be indicative of a characteristic of a subterranean formation at a position relative to the tool string.

Example #3

Provided can be the downhole assembly of any of Examples #1-2, further comprising a communication unit communicatively coupled with the receiver and the at least one angular position sensor. The communication device may be communicatively coupled with the receiver for transmitting the signal information. The communication device may be communicatively coupled with the at least one angular position sensor for transmitting the angular position.

Example #4

Provided can be the downhole assembly of any of Examples #1-2, further comprising a motor coupled with at least one of the transmitter or the receiver, wherein the transmitter or the receiver is rotatable relative to the tool string in response to the motor rotating.

Example #5

Provided can be the downhole assembly of any of Examples #1-4, further comprising a second motor and a drill bit rotatable in response to the second motor rotating, wherein the motor coupled with the transmitter or the receiver is rotatable independently of the second motor.

Example #6

Provided can be the downhole assembly of any of Examples #1-4, wherein the transmitter or the receiver is positioned uphole of the motor.

Example #7

Provided can be the downhole assembly of any of Examples #1-4, wherein the transmitter or the receiver is positioned downhole of the motor.

Example #8

Provided can be the downhole assembly of any of Examples #1-2, further comprising a motor and a drill bit rotatable in response to the motor rotating, wherein the transmitter or the receiver is positioned at the drill bit or adjacent to the drill bit.

Example #9

Provided can be the downhole assembly of any of Examples #1-2, wherein the transmitter or the receiver is rotatable relative to the tool string in a direction opposite to a direction of rotation of the tool string.

Example #10

Provided can be the downhole assembly of any of Examples #1-2, wherein the transmitter is rotatable relative to the tool string and the receiver is rotatable relative to the tool string.

Example #11

Provided can be the downhole assembly of any of Examples #1-10, further comprising a motor coupled with the transmitter and the receiver, wherein the transmitter and the receiver are rotatable together relative to the tool string in response to the motor rotating.

Example #12

Provided can be the downhole assembly of any of Examples #1-10, wherein the at least one angular position sensor includes a first angular position sensor and a second angular position sensor, the downhole assembly further comprising a first motor coupled with the transmitter, wherein the transmitter is rotatable relative to the tool string in response to the first motor rotating and the first angular position sensor is arranged with a first known rotational relationship with the transmitter; and a second motor coupled with the receiver, wherein the receiver is rotatable relative to the tool string in response to the second motor rotating and the second angular position sensor is arranged with a second known rotational relationship with the receiver. The first angular position sensor may detect an angular position of the transmitter relative to the tool string. The second angular position sensor can detect an angular position of the receiver relative to the tool string.

Example #13

Provided can be a system comprising a tool string; a transmitter rotatable relative to the tool string; a first angular position sensor arranged with a first known rotational relationship with the transmitter; a receiver rotatable relative to tool string; a second angular position sensor arranged with a second known rotational relationship with the receiver; and an information handling system communicatively coupled with at least the receiver, the information handling system comprising a processor and a memory device coupled with the processor, the memory device containing a set of instructions that, when executed by the processor, cause the processor to determine a characteristic of a subterranean formation relative to the tool string based, at least in part, on outputs received from the receiver, the first angular position sensor, and the second angular position sensor. The first angular position sensor may detect an angular position of the transmitter. The second angular position sensor may detect an angular position of the receiver. Said outputs may include a signal received by the receiver, the angular position of the transmitter, and the angular position of the receiver.

Example #14

Provided can be the system of Example #13, further comprising a motor torsionally coupled with at least one of the transmitter or the receiver for rotating the torsionally coupled antenna or antennas; and a motor controller communicatively coupled with the motor and the information handling system, wherein the set of instructions contained in the memory device of the information handling system further comprise instructions that, when executed by the processor, cause the processor to instruct the motor controller to control a speed of the torsionally coupled antenna or antennas by controlling a speed of the motor.

Example #15

Provided can be the system of Example #13, wherein the receiver comprises a receive antenna oriented substantially parallel to a transmit antenna of the transmitter and at least one of the transmit antenna or the receive antenna is tilted with respect to a longitudinal axis of the tool string, wherein the set of instructions contained in the memory device of the information handling system further comprise instructions that, when executed by the processor, cause the processor to determine the characteristic of the subterranean formation at a position ahead of an end of the tool string based, at least in part, on the parallel orientation of the receive antenna and the transmit antenna.

Example #16

Provided can be the system of Example #13, wherein the receiver comprises a receive antenna oriented substantially perpendicular to a transmit antenna of the transmitter, wherein the set of instructions contained in the memory device of the information handling system further comprise instructions that, when executed by the processor, cause the processor to determine the characteristic of the subterranean formation at a position lateral to the tool string in a direction lateral to a direction of travel of an end of the tool string based, at least in part, on the perpendicular orientation of the receive antenna and the transmit antenna.

Example #17

Provided can be the system of Example #13, wherein at least one of the transmitter or the receiver includes an antenna having a first winding arranged in a first winding plane and a second winding arranged in a second winding plane, the first winding being tilted relative to the second winding, wherein the set of instructions contained in the memory device of the information handling system further comprise instructions that, when executed by the processor, cause the processor to determine the characteristic of the subterranean formation at a first position in the first winding plane and at a second position in the second winding plane based, at least in part, on respective orientations of the receiver and the transmitter.

Example #18

Provided can be a method comprising transmitting a first signal via a transmitter coupled with a tool string in a subterranean formation; receiving a second signal associated with the first signal via a receiver coupled with the tool string, wherein the transmitter or the receiver is rotating relative to the tool string; detecting an angular position of the transmitter or the receiver as the transmitter or the receiver rotates relative to the tool string; and determining a characteristic of the subterranean formation at a position relative to tool string based, at least in part, on the second signal and the angular position.

Example #19

Provided can be the method of Example #18, wherein using the second signal and the angular position to determine a characteristic of the subterranean formation at a position relative to the tool string includes determining a resistivity of a region of the formation at a distance from the tool string and in a direction from the tool string.

Example #20

Provided can be the method of any of Examples #18-19, further comprising receiving a third signal associated with the first signal via a second receiver coupled with the tool string at a position between the first receiver and the transmitter, wherein the transmitter or the second receiver is rotating relative to the tool string; if the second receiver is rotating relative to the tool string, detecting a second angular position of the receiver as the second receiver rotates relative to the tool string; using a first combination or a second combination to determine the characteristic of the formation at a second position relative to the tool string, the first combination including the third signal and the first angular position, the second combination including the third signal and the second angular position; and creating a profile of the characteristic of the formation based, at least in part, on the determination of the characteristic of the formation at the first position and the determination of the characteristic of the formation at the second position.

The foregoing description of the aspects, including illustrated examples, of the disclosure has been presented only for the purpose of illustration and description and is not intended to be exhaustive or to limit the disclosure to the precise forms disclosed. Numerous modifications, adaptations, and uses thereof will be apparent to those skilled in the art without departing from the scope of this disclosure.

What is claimed is:

1. A method comprising:
   transmitting a first signal via a transmitter coupled with a tool string in a subterranean formation;
   receiving a second signal associated with the first signal via a receiver coupled with the tool string, wherein the transmitter or the receiver is rotating relative to the tool string, wherein at least one of the transmitter or the receiver includes an antenna having a first winding arranged in a first winding plane and a second winding arranged in a second winding plane, the first winding being tilted relative to the second winding;
   detecting an angular position of the transmitter or the receiver as the transmitter or the receiver rotates relative to the tool string; and
   determining a characteristic of the subterranean formation at a first position in the first winding plane and at a second position in the second winding plane relative to tool string based, at least in part, on the second signal and the angular position.

2. The method of claim 1, wherein determining the characteristic of the subterranean formation at a position relative to the tool string includes determining a resistivity of a region of the formation at a distance from the tool string and in a direction from the tool string.

3. The method of claim 2 wherein the receiver comprises a receive antenna with a substantially perpendicular orientation relative to a transmit antenna of the transmitter.

4. The method of claim 3 wherein the characteristic of the subterranean formation is determined at a position lateral to the tool string in a direction lateral to a direction of travel of an end of the tool string based, at least in part, on the substantially perpendicular orientation of the receive antenna relative to the transmit antenna.

5. The method of claim 1 wherein the transmitter and the receiver include the antenna having a first winding arranged in a first winding plane and a second winding arranged in a second winding plane.

6. The method of claim 1 wherein the transmitter and the receiver rotate relative to the tool string.

7. The method of claim 6 further comprising controlling a speed of a motor to rotate the transmitter and the receiver.

8. The method of claim 1, further comprising:
   receiving a third signal associated with the first signal via a second receiver coupled with the tool string at a position between the receiver and the transmitter, wherein the transmitter or the second receiver is rotating relative to the tool string;
   if the second receiver is rotating relative to the tool string, detecting a second angular position of the receiver as the second receiver rotates relative to the tool string;
   using a first combination or a second combination to determine the characteristic of the formation at a second position relative to the tool string, the first combination including the third signal and the first angular position, the second combination including the third signal and the second angular position; and
   creating a profile of the characteristic of the formation based, at least in part, on the determination of the characteristic of the formation at the first position and the determination of the characteristic of the formation at the second position.

9. An information-handling system comprising:
   a controller; and
   a memory including machine-readable instructions that are accessible by the controller for causing the controller to perform one or more operations comprising:
   transmitting a first signal via a transmitter coupled with a tool string in a subterranean formation;
   receiving a second signal associated with the first signal via a receiver coupled with the tool string, while the transmitter or the receiver is rotating relative to the tool string, wherein at least one of the transmitter or the receiver includes an antenna having a first winding arranged in a first winding plane and a second winding arranged in a second winding plane, the first winding being tilted relative to the second winding;
   detecting an angular position of the transmitter or the receiver as the transmitter or the receiver rotates relative to the tool string; and
   determining a characteristic of the subterranean formation at a first position in the first winding plane and at a second position in the second winding plane relative to tool string based, at least in part, on the second signal and the angular position.

10. The information handling system of claim 9, wherein the operation of determining the characteristic of the subterranean formation at a position relative to the tool string includes determining a resistivity of a region of the formation at a distance from the tool string and in a direction from the tool string.

11. The information handling system of claim 10 wherein the receiver comprises a receive antenna with a substantially perpendicular orientation relative to a transmit antenna of the transmitter.

12. The information handling system of claim 11 wherein the characteristic of the subterranean formation is determined at a position lateral to the tool string in a direction lateral to a direction of travel of an end of the tool string based, at least in part, on the substantially perpendicular orientation of the receive antenna relative to the transmit antenna.

13. The information handling system of claim 9 wherein the transmitter and the receiver include the antenna having a first winding arranged in a first winding plane and a second winding arranged in a second winding plane.

14. The information handling system of claim 9 wherein the transmitter and the receiver rotate relative to the tool string.

15. The information handling system of claim 9 the one or more operations further comprises controlling a speed of a motor to rotate the transmitter and the receiver.

16. The information handling system of claim 9, wherein the one or more operation further comprises:

receiving a third signal associated with the first signal via a second receiver coupled with the tool string at a position between the receiver and the transmitter, wherein the transmitter or the second receiver is rotating relative to the tool string;

if the second receiver is rotating relative to the tool string, detecting a second angular position of the receiver as the second receiver rotates relative to the tool string;

using a first combination or a second combination to determine the characteristic of the formation at a second position relative to the tool string, the first combination including the third signal and the first angular position, the second combination including the third signal and the second angular position; and creating a profile of the characteristic of the formation based, at least in part, on the determination of the characteristic of the formation at the first position and the determination of the characteristic of the formation at the second position.

* * * * *